(12) United States Patent
Seo

(10) Patent No.: US 7,738,197 B2
(45) Date of Patent: Jun. 15, 2010

(54) STAGE APPARATUS, AND CAMERA SHAKE CORRECTION APPARATUS USING THE STAGE APPARATUS

(75) Inventor: Shuzo Seo, Tokyo (JP)

(73) Assignee: Hoya Corporation, Tokyo (JP)

( * ) Notice: Subject to any disclaimer, the term of this patent is extended or adjusted under 35 U.S.C. 154(b) by 858 days.

(21) Appl. No.: 11/469,929

(22) Filed: Sep. 5, 2006

(65) Prior Publication Data

US 2007/0058076 A1 Mar. 15, 2007

(30) Foreign Application Priority Data

Sep. 6, 2005 (JP) ............................. 2005-257799

(51) Int. Cl.
G02B 7/02 (2006.01)
(52) U.S. Cl. .................... 359/824; 359/822; 359/819
(58) Field of Classification Search ................ 359/554, 359/557, 811, 813, 822–824; 396/52, 55, 396/72, 75; 348/208.4, 208.5, 208.9, 208.99
See application file for complete search history.

(56) References Cited

U.S. PATENT DOCUMENTS

| | | | |
|---|---|---|---|
| 7,327,952 B2 * | 2/2008 | Enomoto ................ 396/55 |
| 7,379,093 B2 * | 5/2008 | Seo ..................... 348/208.4 |
| 7,444,072 B2 * | 10/2008 | Seo ........................ 396/55 |
| 7,460,776 B2 * | 12/2008 | Hirunuma et al. ........ 396/55 |
| 2005/0157287 A1 | 7/2005 | Seo |
| 2005/0185057 A1 | 8/2005 | Seo |
| 2005/0204640 A1 | 9/2005 | Seo |
| 2005/0270379 A1 | 12/2005 | Seo |
| 2005/0276589 A1 | 12/2005 | Seo |
| 2006/0007320 A1 | 1/2006 | Seo |
| 2006/0064884 A1 | 3/2006 | Seo |
| 2006/0070302 A1 | 4/2006 | Seo |
| 2006/0146400 A1 | 7/2006 | Seo |

FOREIGN PATENT DOCUMENTS

| | | |
|---|---|---|
| JP | 2001-218102 | 8/2001 |
| JP | 2003-134383 | 5/2003 |
| JP | 2004-260645 | 9/2004 |
| JP | 2005-351917 | 12/2005 |
| JP | 2005-352113 | 12/2005 |
| JP | 2006-94185 | 4/2006 |
| JP | 2006-94199 | 4/2006 |

OTHER PUBLICATIONS

English language Abstract of JP 2006-94199.
U.S. Appl. No. 11/423,593 to Seo et al., which was filed on Jun. 12, 2006.
English language Abstract of JP 2001-218102.
English language Abstract of JP 2003-134383.
English language Abstract of JP 2004-260645.

* cited by examiner

*Primary Examiner*—Mohammed Hasan
(74) *Attorney, Agent, or Firm*—Greenblum & Bernstein P.L.C.

(57) ABSTRACT

A stage apparatus comprising: a stationary support board; a movable stage positioned to face the stationary support board to be movable relative to the stationary support board; at least three support members which are in contact with one surface of the movable stage which faces the stationary support board to be slidable thereon; at least three position adjusting devices provided on the stationary support board and configured to adjust positions of the three support members, respectively, in a direction toward/away from the movable stage; and a biasing device which biases the movable stage in a direction to bring the three support members into contact with the movable stage.

28 Claims, 10 Drawing Sheets

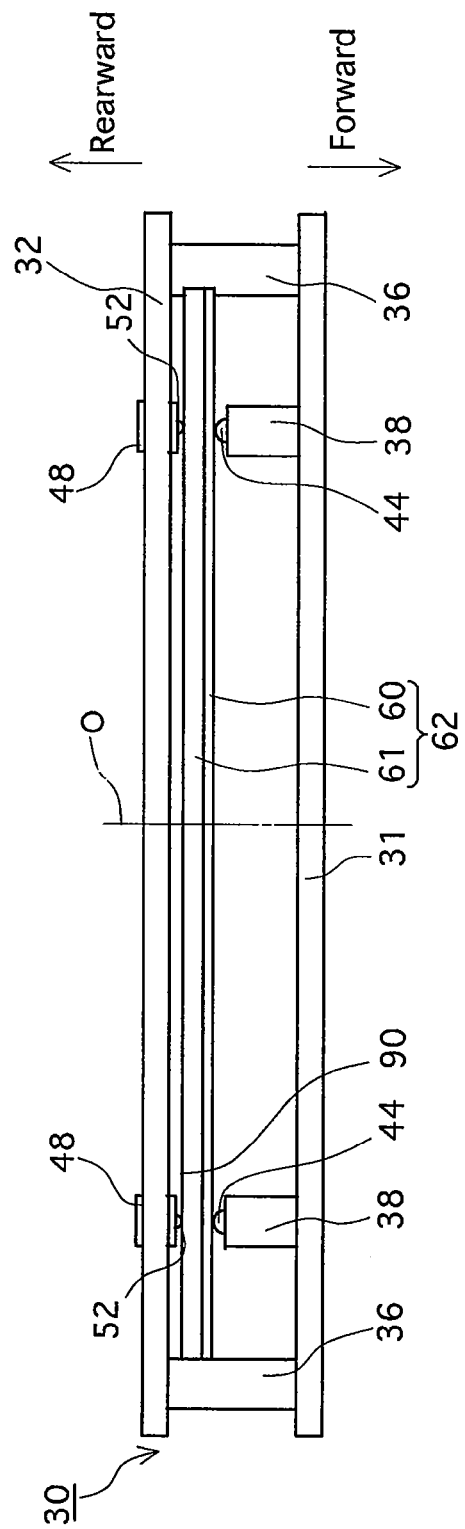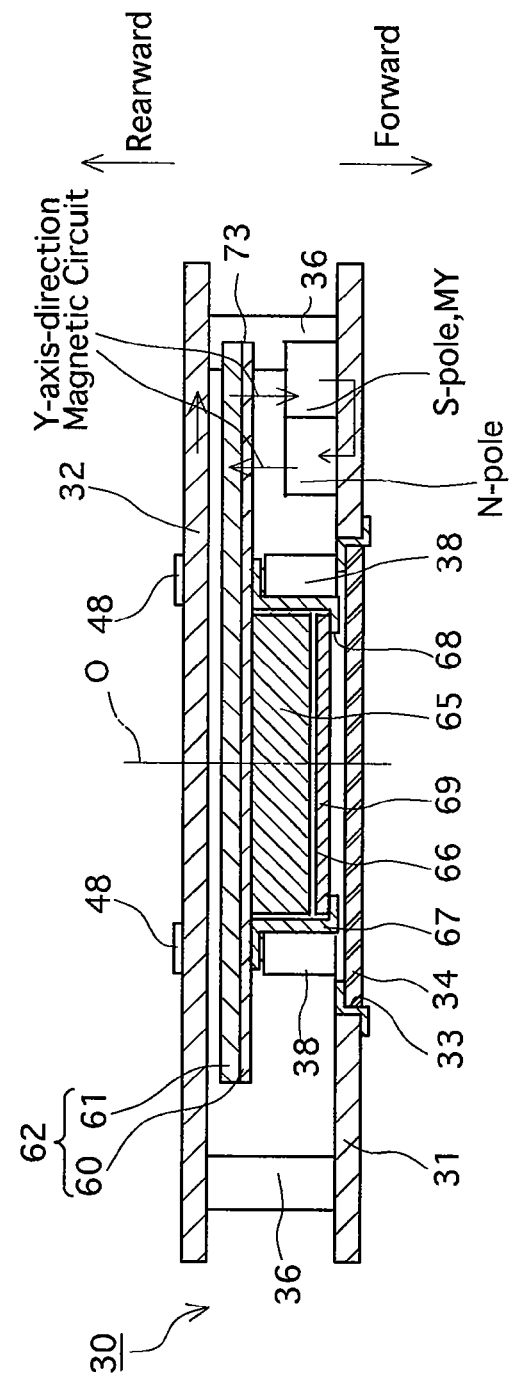

STAGE APPARATUS, AND CAMERA SHAKE CORRECTION APPARATUS USING THE STAGE APPARATUS

BACKGROUND OF THE INVENTION

1. Field of the Invention

The present invention relates to a stage apparatus which includes a movable stage supported to be freely movable in a specific plane, and a camera shake correction apparatus of a camera using the stage apparatus.

2. Description of the Prior Art

A stage apparatus which makes it possible to move an electrical board (movable stage) that supports an image pickup device freely relative to a stationary support board (i.e., not only to move the electrical board in the X-axis direction and the Y-axis direction that are parallel to the electrical board and orthogonal to each other but also to rotate the electrical board in a plane (reference plane) in which the electrical board lies) so that the effects of hand shake (camera shake) including rotational deflections can be counteracted has been achieved and proposed by the assignee of the present invention in Japanese patent applications Nos. 2004-169376, 2004-172314, 2004-277731 and 2004-277879.

In the stage apparatuses disclosed in these Japanese patent publications, the electrical board is provided thereon with a pair of drive coils: an X-axis direction drive coil for driving the electrical board in the X-axis direction and a Y-axis direction drive coil for driving the electrical board in the Y-axis direction. By adjusting the magnitude of an electric current supplied to each of these two drive coils, an X-axis direction driving force, a Y-axis direction driving force or a rotational driving force is given to the electrical board to move the image pickup device in directions to compensate camera shake (linear deflections/rotational deflections) by such driving forces.

In the stage apparatuses disclosed in the aforementioned patent publications, the imaging surface of the image pickup device must be positioned orthogonal to an optical axis of a photographing optical system at all times. However, these stage apparatuses are not provided with any device for adjusting the angle of inclination of the imaging surface relative to the optical axis and the axial position of the imaging surface in the optical axis direction in an easy manner nor for maintaining such an angle and axial position in an easy manner upon having been adjusted to a desired angle and a desired axial position, respectively.

SUMMARY OF THE INVENTION

The present invention provides a stage apparatus which is configured to be capable of adjusting the angle of inclination of a movable stage relative to an optical axis and the axial position of the movable stage in the optical axis direction in an easy manner and capable of maintaining this angle and this axial position after making adjustments thereto in an easy manner in the case where the movable stage is freely movable in a specific plane.

The present invention further provides a camera sake correction apparatus of a camera using this stage apparatus.

According to an aspect of the present invention, a stage apparatus is provided, including a stationary support board; a movable stage positioned to face the stationary support board to be movable relative to the stationary support board; at least three support members which are in contact with one surface of the movable stage which faces the stationary support board to be slidable thereon; at least three position adjusting devices provided on the stationary support board and configured to adjust positions of the three support members, respectively, in a direction toward/away from the movable stage; and a biasing device which biases the movable stage in a direction to bring the three support members into contact with the movable stage.

It is desirable for each of the three support members to be a ball.

It is desirable for each of the position adjusting devices to include a female screw hole formed in one of the stationary support board and the movable stage; and a male screw member which is screwed into the female screw hole and supports the support member.

It is desirable for the stage apparatus to include an X-axis-direction driver which drives the movable stage relative to the stationary support board in a specific X-axis direction parallel to the stationary support board; and a Y-axis-direction driver which drives the movable stage relative to the stationary support board in a Y-axis direction parallel to the stationary support board and orthogonal to the specific X-axis direction.

It is desirable for the X-axis-direction driver to include at least one X-axis-direction magnetic force generator fixed to one of the stationary support board and a second stationary support board which is provided parallel to the stationary support board and faces the other surface of the movable stage; and at least one X-axis-direction drive coil which is fixed to the movable stage and produces a driving force for driving the movable stage in the X-axis direction upon being supplied with an electric current in a state where the X-axis-direction drive coil receives a magnetic force generated by the X-axis-direction magnetic force generator.

It is desirable for the X-axis-direction driver to include at least one X-axis-direction magnetic force generator fixed to the movable stage; and at least one X-axis-direction drive coil which is fixed to one of the stationary support board and a second stationary support board which is provided parallel to the stationary support board and faces the other surface of the movable stage, wherein the X-axis-direction drive coil produces a driving force for driving the movable stage in the X-axis direction upon being supplied with an electric current in a state where the X-axis-direction drive coil receives a magnetic force generated by the X-axis-direction magnetic force generator.

It is desirable for the X-axis-direction magnetic force generator to include at least one magnet and at least one yoke, a magnetic circuit being formed between the magnet and the yoke.

It is desirable for the Y-axis-direction driver to include at least one Y-axis-direction magnetic force generator fixed to one of the stationary support board and a second stationary support board which is provided parallel to the stationary support board and faces the other surface of the movable stage; and at least one Y-axis-direction drive coil which is fixed to the movable stage and produces a driving force for driving the movable stage in the Y-axis direction upon being supplied with an electric current in a state where the Y-axis-direction drive coil receives a magnetic force generated by the Y-axis-direction magnetic force generator.

It is desirable for the Y-axis-direction driver to include at least one Y-axis-direction magnetic force generator fixed to the movable stage; and at least one Y-axis-direction drive coil which is fixed to one of the stationary support board, the movable stage, and a second stationary support board which is provided parallel to the stationary support board and faces the other surface of the movable stage. The Y-axis-direction drive coil produces a driving force for driving the movable stage in the Y-axis direction upon being supplied with an electric current in a state where the Y-axis-direction drive coil receives a magnetic force generated by the Y-axis-direction magnetic force generator.

It is desirable for the Y-axis-direction magnetic force generator to include at least one magnet and at least one yoke, a magnetic circuit being formed between the magnet and the yoke.

It is desirable for a recess in which the ball is partly accommodated is formed in the male screw member.

In an embodiment, a stage apparatus is provided, including a first stationary support board; a second stationary support board; a movable stage positioned between the first stationary support board and the second stationary support board; at least three first support members which are in contact with one of first facing surfaces of the first stationary support board and the movable stage which face each other to be slidable on the one first facing surface; at least three second support members which are in contact with one of second facing surfaces of the second stationary support board and the movable stage which face each other to be slidable on the one second facing surface; a position adjusting device provided on one of the first stationary support board and the movable stage which includes the other of the first facing surfaces, wherein the position adjusting device is operated to move the three first support members toward one of the first stationary support board and the movable stage, and holds the three first support members at desired position, respectively; and a biasing force adjusting device, provided on one of the second stationary support board and the movable stage which includes the other of the second facing surfaces, for biasing the second support members against the one second facing surface.

It is desirable for each of the three first support members to be a ball.

It is desirable for the position adjusting device to include at least three first female screw holes formed in one of the first stationary support board and the movable stage; and at least three first male screw members which are screwed into the three first female screw holes and support the three first support members, respectively.

It is desirable for each of the three second support members to be a ball.

It is desirable for the biasing force adjusting device to include at least three second female screw holes formed in one of the second stationary support board and the movable stage; at least three second male screw members which are screwed into the second female screw holes, respectively; and a biasing device, supported by the second male screw members, for biasing the second male screw members in a direction toward the other of the second stationary support board and the movable stage.

It is desirable for the biasing force adjusting device to include at least three second female screw holes formed in one of the second stationary support board and the movable stage; at least three second male screw members which are screwed into the second female screw holes, respectively; and a biasing device, supported by the other of the second stationary support board and the movable stage, for biasing the second support members so as contact the second male screw members, respectively.

It is desirable for the stage apparatus to include an X-axis-direction driver which drives the movable stage relative to the first stationary support board in a specific X-axis direction parallel to the first stationary support board; and a Y-axis-direction driver which drives the movable stage relative to the first stationary support board in a Y-axis direction parallel to the first stationary support board and orthogonal to the specific X-axis direction.

It is desirable for the X-axis-direction driver to include at least one X-axis-direction magnetic force generator fixed to one of the first stationary support board and the second stationary support board; and at least one X-axis-direction drive coil which is fixed to the movable stage and produces a driving force for driving the movable stage in the X-axis direction upon being supplied with an electric current in a state where the X-axis-direction drive coil receives a magnetic force generated by the X-axis-direction magnetic force generator.

It is desirable for the X-axis-direction driver to include at least one X-axis-direction magnetic force generator fixed to the movable stage; and at least one X-axis-direction drive coil which is fixed to one of the first stationary support board and the second stationary support board and produces a driving force for driving the movable stage in the X-axis direction upon being supplied with an electric current in a state where the X-axis-direction drive coil receives a magnetic force generated by the X-axis-direction magnetic force generator.

It is desirable for the X-axis-direction magnetic force generator to include at least one magnet and at least one yoke, a magnetic circuit being formed between the magnet and the yoke.

It is desirable for the Y-axis-direction driver to include at least one Y-axis-direction magnetic force generator fixed to one of the first stationary support board and the second stationary support board; and at least one Y-axis-direction drive coil which is fixed to the movable stage and produces a driving force for driving the movable stage in the Y-axis direction upon being supplied with an electric current in a state where the Y-axis-direction drive coil receives a magnetic force generated by the Y-axis-direction magnetic force generator.

It is desirable for the Y-axis-direction driver to include at least one Y-axis-direction magnetic force generator fixed to the movable stage; and at least one Y-axis-direction drive coil which is fixed to one of the first stationary support board, the second stationary support board, and the movable stage. The Y-axis-direction drive coil produces a driving force for driving the movable stage in the Y-axis direction upon being supplied with an electric current in a state where the Y-axis-direction drive coil receives a magnetic force generated by the Y-axis-direction magnetic force generator.

It is desirable for the X-axis-direction magnetic force generator to include at least one magnet and at least one yoke, a magnetic circuit being formed between the magnet and the yoke.

In an embodiment, a camera shake correction apparatus is provided in a camera, the camera shake correction apparatus using the stage apparatus and includes a correcting optical element fixed to the movable stage; an X-axis-direction deflection sensor for detecting deflections of the camera in the X-axis direction; a Y-axis-direction deflection sensor for detecting deflections of the camera in the Y-axis direction; and a controller which controls operations of the X-axis-direction driver and the Y-axis-direction driver to drive the movable stage, to which the correcting optical element is fixed, in a manner to compensate camera shake in accordance with information on the deflections detected by the X-axis-direction deflection sensor and the Y-axis-direction deflection sensor.

It is desirable for the correcting optical element to include an image pickup device fixed to a front surface of the movable stage.

It is desirable for the correcting optical element to be a correction lens positioned in a through hole formed in the movable stage.

It is desirable for the camera shake correction apparatus to include a rotation-direction deflection sensor for detecting deflections of the movable stage about the optical axis in a plane parallel to the movable stage. The controller controls operations of the X-axis-direction driver and the Y-axis-direction driver to drive the movable stage in a manner to compensate camera shake in accordance with information on the deflections detected by the rotation-direction deflection sensor.

According to the present invention, in the case where the movable stage is freely movable in a specific plane, the angle of inclination of the movable stage relative to the stationary support board and the position of the movable stage in a direction connecting the stationary support board and the movable stage can be easily adjusted; moreover, this angle of inclination and this position of the movable stage can be easily held after being adjusted.

The present disclosure relates to subject matter contained in Japanese Patent Application No. 2005-257799 (filed on Sep. 6, 2005) which is expressly incorporated herein in its entirety.

BRIEF DESCRIPTION OF THE DRAWINGS

The present invention will be discussed below in detail with reference to the accompanying drawings, in which:

FIG. 3 is a plan view of the camera shake correction apparatus, viewed in the direction of the arrow III shown in FIG. 2;

FIG. 4 is a cross sectional view taken along IV-IV line shown in FIG. 2;

DESCRIPTION OF THE PREFERRED EMBODIMENTS

A digital camera which incorporates an embodiment of a camera shake correction apparatus (stage apparatus/image stabilizer) according to the present invention will be hereinafter discussed with reference to FIGS. 1 through 11. In the following description, the horizontal direction and the vertical direction of the digital camera 20 are referred to as an X-axis direction and a Y-axis direction, respectively.

Figure 1:
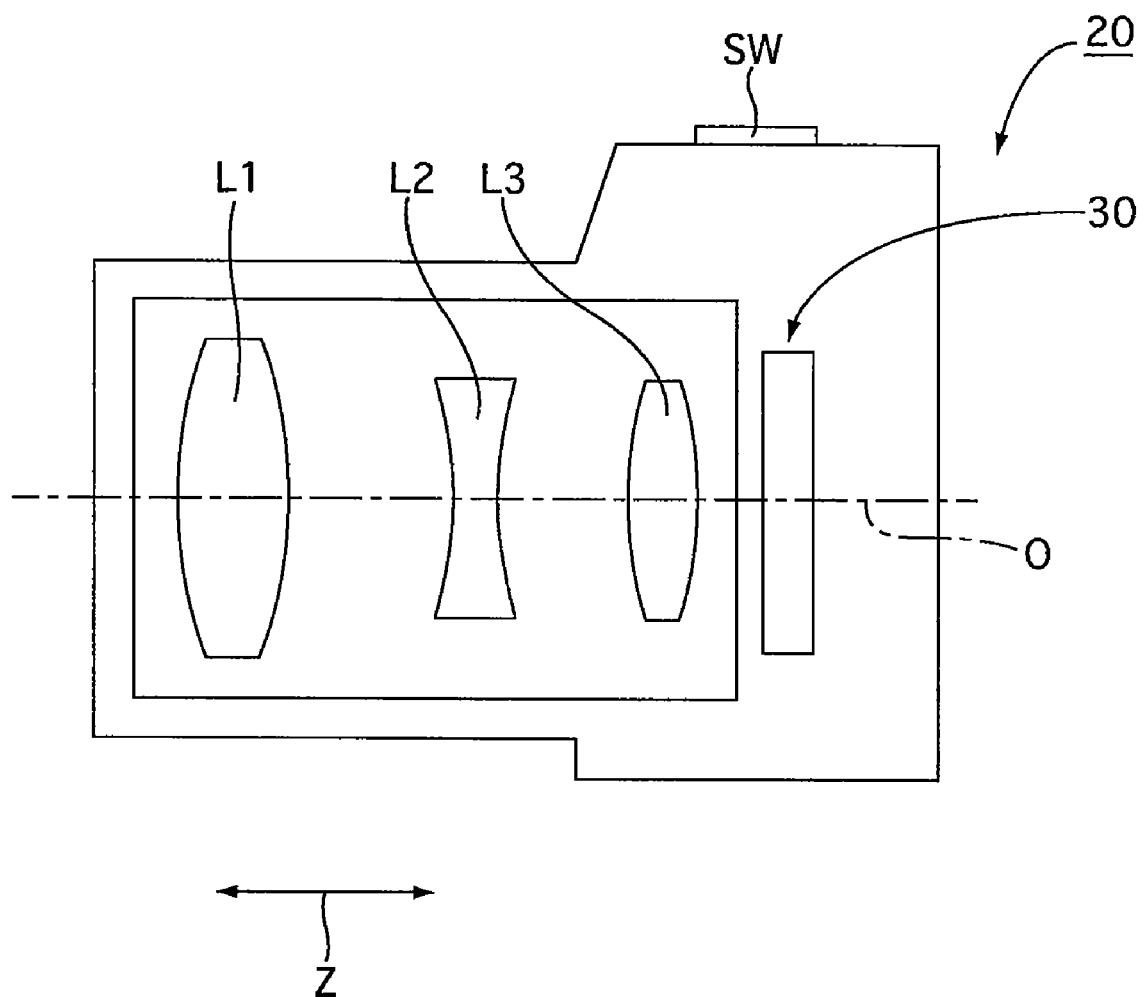
FIG. 1 is a longitudinal sectional view of a digital camera which incorporates an embodiment of a camera shake correction apparatus (stage apparatus) according to the present invention.

As shown in FIG. 1, the digital camera 20 is provided therein with a photographing optical system including a plurality of lenses L1, L2 and L3, and is provided behind the rear lens L3 with a camera shake correction apparatus (stage apparatus) 30.

The structure of the camera shake correction apparatus 30 will be hereinafter discussed in detail with reference to FIGS. 2 through 9.

As shown in FIGS. 2 through 6, the camera shake correction apparatus 30 is provided with a front stationary support board (second stationary support board) 31 and a rear stationary support board (first stationary support board/an element of an X-axis-direction magnetic force generator/an element of a Y-axis direction magnetic force generator) 32. The front stationary support board 31 is in the shape of a horizontally-elongated rectangle as viewed from the front and is made of a soft magnetic material such as metal. The rear stationary support board 32 has the same shape and size as the front stationary support board 31 and is made of a soft magnetic material such as metal. The front stationary support board 31 is provided in a central portion thereof with a rectangular fixing hole (through hole) 33 in which an infrared-cut filter 34 having the same rectangular shape as the rectangular fixing hole 33 is fitted to be fixed thereto.

Figure 2:
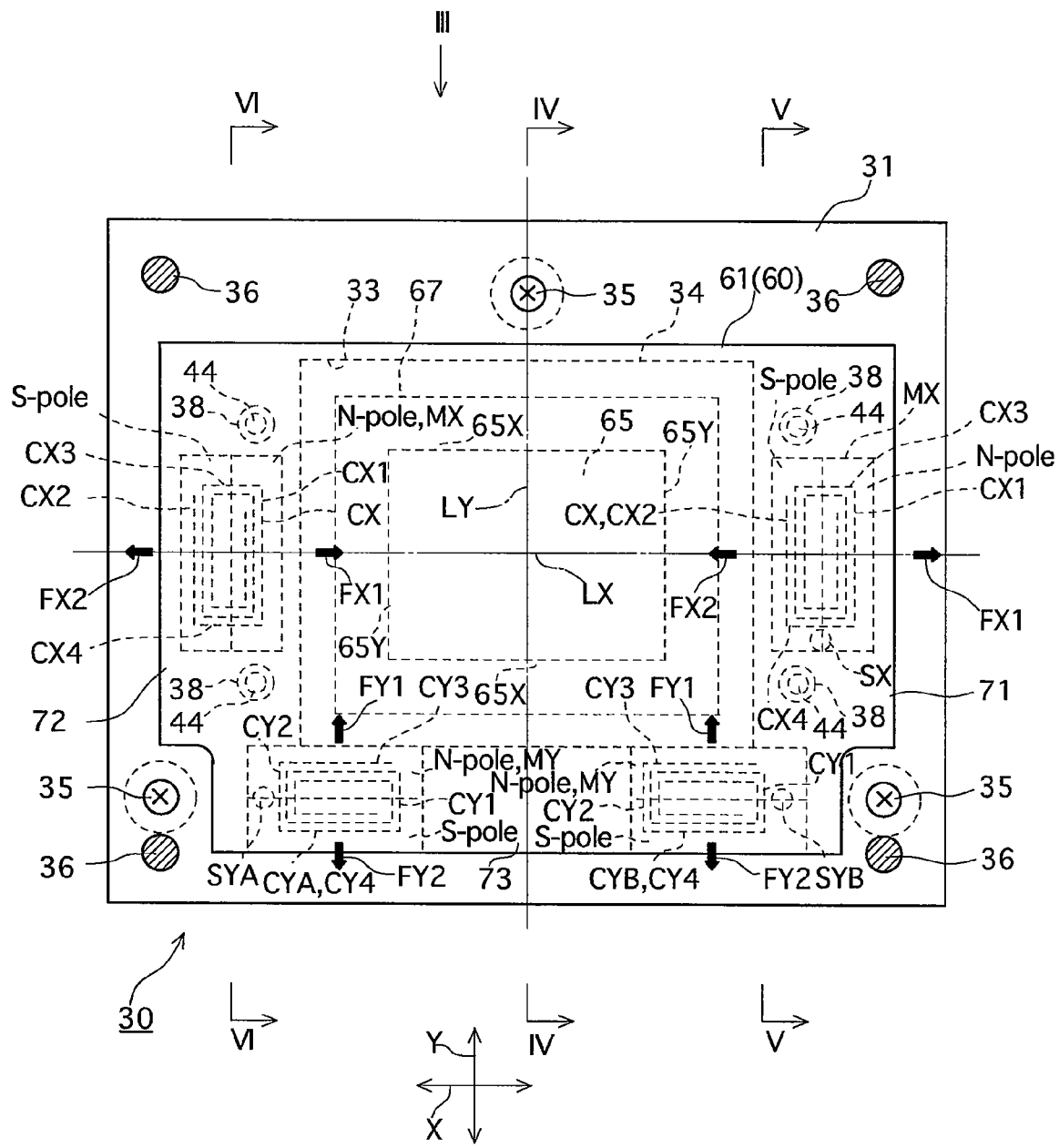
FIG. 2 is a rear elevational view of the camera shake correction apparatus shown in FIG. 1, wherein a rear stationary support board is removed for the purpose of illustration.

As shown in FIG. 2, three through holes are formed in the front stationary support board 31 at three different position thereon, respectively, and three set screws 35 are inserted into the three through holes, respectively. The three set screws 35 are screwed into three female screw holes (not shown) formed on an inner surface of a camera body of the digital camera 20.

The front stationary support board 31 and the rear stationary support board 32 are connected to each other in the vicinity of the four corners thereof by four support cylindrical columns 36, respectively, which are held between the front stationary support board 31 and the rear stationary support board 32 and extend parallel to one another in the forward/rearward direction (horizontal direction as viewed in FIG. 1). The front stationary support board 31 and the rear stationary support board 32 that are thus connected to each other are parallel to each other.

Figure 7:
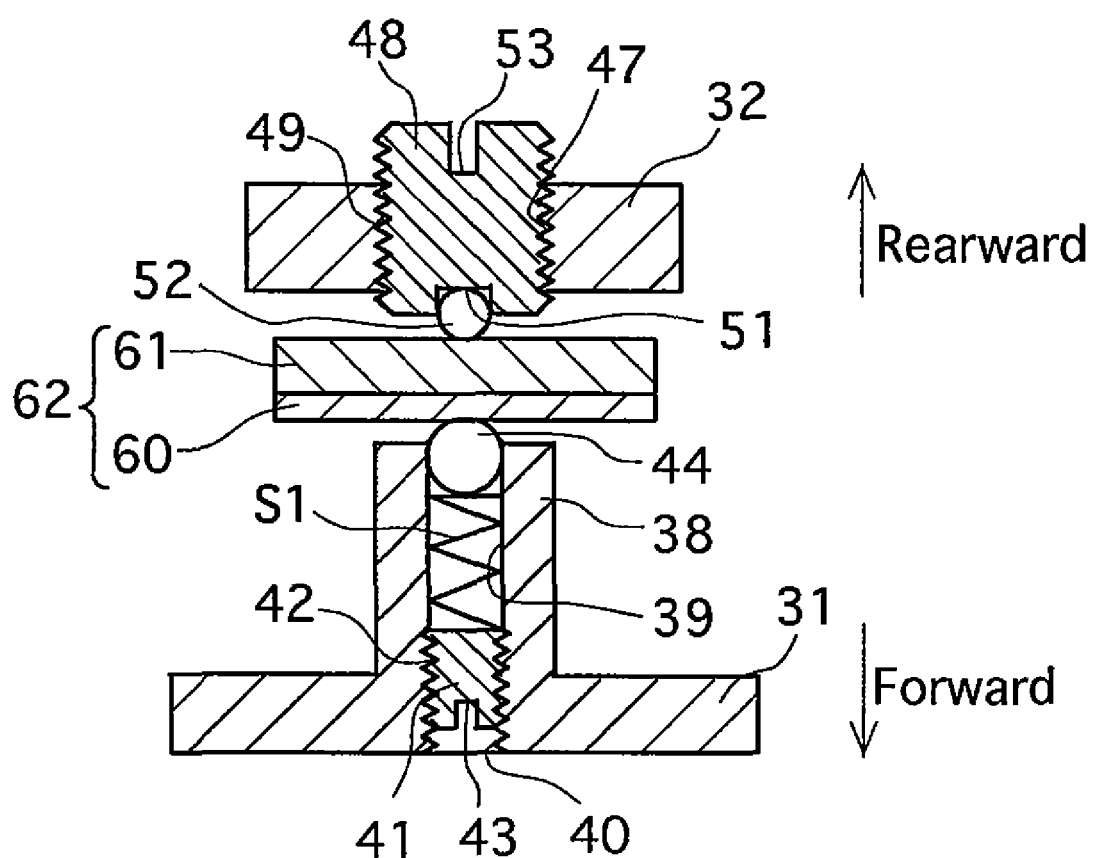
FIG. 7 is an enlarged longitudinal sectional view of an electrical board and a reinforcing plate, which include a movable stage, and a support device for supporting this movable stage.

The front stationary support board 31 is provided, on a rear surface thereof at four positions on this rear surface, with four cylindrical support projections 38, respectively, which project rearward. As shown in FIG. 7, four through holes (elements of a biasing force adjusting device) 39 are bored through the four cylindrical support projections 38 along the axes thereof, respectively, and the front stationary support board 31, to extend in the forward/rearward direction. A front portion of the inner peripheral surface in each through hole 39 is threaded to serve as a female screw hole (an element of the biasing force adjusting device/an element of a second female screw hole) 40 into which an adjusting member (second male screw member/headless screw/an element of the biasing force adjusting device) 41 including a male thread 42 threaded on the entire outer peripheral surface is screwed. Each adjusting member 41 is provided on a front end surface thereof with a screwdriver insertion slot (recess) 43 into which a thin wedge-shaped end (insertion end) of a flat blade screwdriver (not shown) can be inserted. A compression coil spring (an element of the biasing force adjusting device/biasing device) S1 is installed in each through hole 39 so that the front end of the compression coil spring S1 is in contact with the rear end of the associated adjusting member 41. The rear end of the compression coil spring S1 installed in each through hole 39 is in contact with a metal ball (second support member) 44 which is accommodated (partly accommodated) in the through hole 39 to be freely rotatable and slidable therein. Each ball 44 is biased rearward by the associated compression coil spring S1.

Four female screw holes (an element of a first female screw hole/through holes) 47 are formed in the rear stationary support board 32 at four positions thereon aligned with the four cylindrical support projections 38 in the forward/rearward direction, respectively. Four adjusting members (position adjusting device/first male screw members) 48, each of which includes a male thread 49 threaded on the entire outer peripheral surface thereof, are screwed into the four female screw holes 47, respectively. The lengths of the adjusting members 48 are longer than the wall thickness of the rear stationary support board 32 in the forward/rearward direction. The front end surface of each adjusting member 48 is provided thereon with a recess 51 in which a rear half of a metal ball (first support member) 52 is accommodated to be freely rotatable in the recess 51. Each adjusting member 48 is provided on a rear end surface thereof with a screwdriver insertion slot (recess) 53 into which a thin wedge-shaped end of a flat blade screwdriver (not shown) can be inserted.

As viewed from the front of the camera shake correction apparatus 30, an X-axis-direction line LX shown in FIG. 2 is an imaginary line which linearly extends in the X-axis-direction and passes through the centers of the front stationary support board 31 and the rear stationary support board 32, and a Y-axis-direction line LY is an imaginary line which linearly extends in the Y-axis-direction and passes through the centers of the front stationary support board 31 and the rear stationary support board 32. In addition, as viewed from the front of the camera shake correction apparatus 30, the positions of the four cylindrical support projections 38 and the four female screw holes 47 are predetermined so that the distance from the X-axis-direction line LX to the two upper balls 44 (and the two upper balls 52) in the Y-axis direction is the same as the distance from the X-axis-direction line LX to the two lower balls 44 (and the two lower balls 52) in the Y-axis direction. Additionally, as viewed from the front of the camera shake correction apparatus 30, the positions of the four cylindrical support projections 38 and the four female screw holes 47 are predetermined so that the distance from the Y-axis-direction line LY to the two left balls 44 (and the two left balls 52) in the X-axis direction is the same as the distance from the Y-axis-direction line LY to the two right balls 44 (and the two right balls 52) in the X-axis direction.

The camera shake correction apparatus 30 is provided, on the rear surface of the front stationary support board 31 at horizontally opposite ends thereof, with two X-axis-direction magnets (elements of the X-axis-direction magnetic force generator) MX which are secured to the rear surface of the front stationary support board 31 so that an S-pole and an N-pole of each X-axis-direction magnet MX are aligned in the X-axis-direction. The two X-axis-direction magnets (right and left X-axis-direction magnets) MX are aligned in the X-axis direction and the positions of the two X-axis-direction magnets MX in the Y-axis direction are the same (the centers of the two X-axis-direction magnets MX are positioned on the X-axis-direction line LX). Two magnetic circuits (two X-axis-direction magnetic circuits) are formed between the two X-axis-direction magnets MX and two portions of the rear stationary support board 32 which face the two X-axis-direction magnets MX in the forward/rearward direction, respectively. Namely, the front stationary support board 31 and the rear stationary support board 32 function as yokes.

Figure 5:
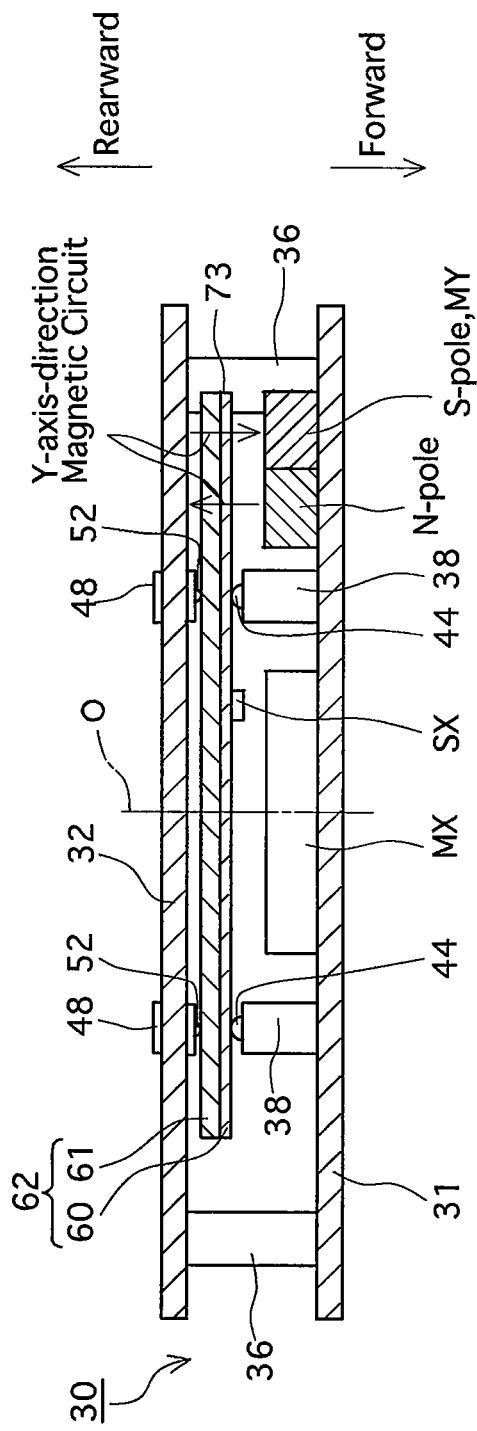
FIG. 5 is a cross sectional view taken along V-V line shown in FIG. 2.
Figure 6:
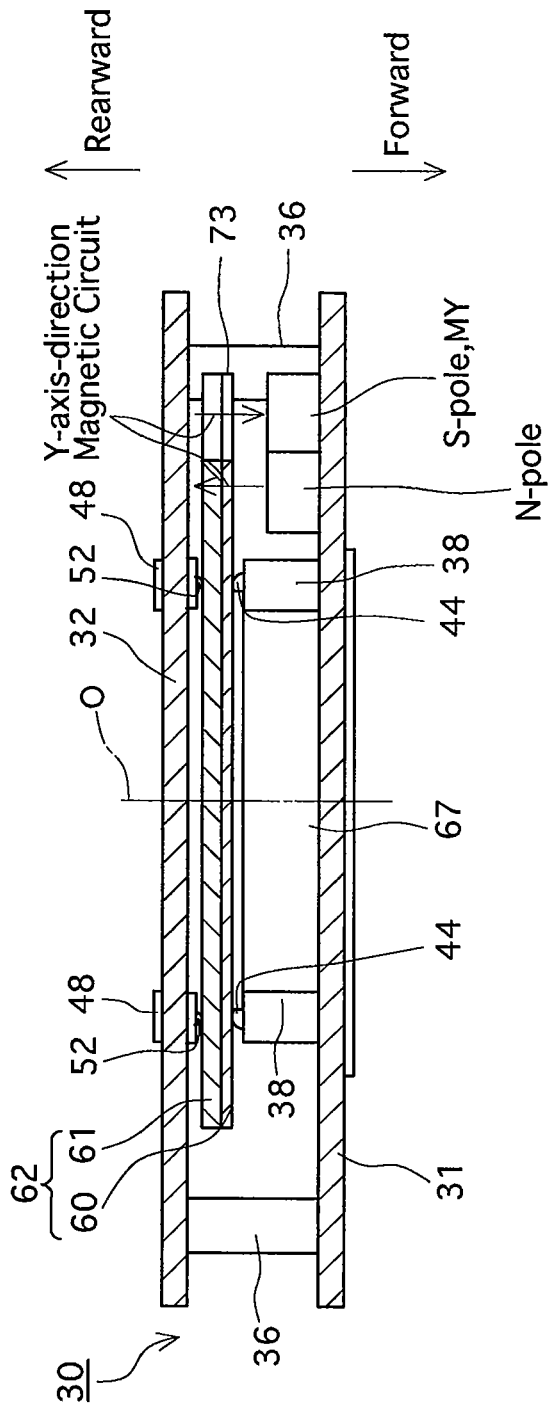
FIG. 6 is a cross sectional view taken along VI-VI line shown in FIG. 2.

On the other hand, the camera shake correction apparatus 30 is provided, on the rear surface of the front stationary support board 31 at a lower end thereof, with two Y-axis-direction magnets (elements of the Y-axis-direction magnetic force generator) MY which are secured to the rear surface of the front stationary support board 31 so that an S-pole and an N-pole of each Y-axis-direction magnet MY are aligned in the Y-axis-direction. The two Y-axis-direction magnets (right and left Y-axis-direction magnets) MY are aligned in the X-axis direction and the positions of the two Y-axis-direction magnets MY in the Y-axis direction are the same (the centers of the two Y-axis-direction magnets MY are positioned on a straight line (not shown) parallel to the X-axis-direction line LX). As shown in FIGS. 4 through 6, two magnetic circuits (two Y-axis-direction magnetic circuits) are formed between the two Y-axis-direction magnets MY and two portions of the rear stationary support board 32 which face the two Y-axis-direction magnets MY in the forward/rearward direction, respectively. Namely, the front stationary support board 31 and the rear stationary support board 32 function as yokes.

The electrical board 60 is a flat rectangular board and a reinforcing plate 61 having the same shape as the electrical board 60 as viewed from the front is fixed to the back of the electrical board 60 to be integral therewith so as to constitute a movable stage 62. As shown in FIGS. 3 through 7, the four balls 44, which are respectively installed in the through holes 39 of the four support projections 38, are in contact with four points on the front surface of the electrical board 60 (i.e., the front surface of the movable stage 62) to be freely rotatable thereat, while the four balls 52, which are respectively installed in the recesses 51 of the four adjusting members 48, are in contact with four points on the rear surface of the reinforcing plate 61 (i.e., the rear surface of the movable stage 62) to be freely rotatable thereat. Accordingly, the electrical board 60 and the reinforcing plate 61, i.e., the movable stage 62 of the camera shake correction apparatus 30, is held between the four balls 44 and the four balls 52 that are positioned behind the four balls 44 in the forward/rearward direction.

Therefore, the movable stage 62 not only can move linearly in the X-axis direction and the Y-axis direction relative to the front stationary support board 31 and the rear stationary support board 32 from the initial position shown in FIG. 2, but also can rotate in an X-Y axis plane, which is parallel to both the X-axis direction and the Y-axis direction and orthogonal to an optical axis O of the photographing optical system of the digital camera 20. The camera shake correction apparatus 30 is provided between the electrical board 60 and the front stationary support board 31 with a moving range limiting device (not shown) which limits the range of movement of the movable stage 62 relative to the front stationary support board 31 to a predetermined range of movement.

A CCD (image pickup device) 65 is fixed to a front surface of the electrical board 60 at the center thereof. As shown in FIG. 2, the CCD 65 is in the shape of a rectangle as viewed from the front thereof. In the state shown in FIG. 2, in which the electrical board 60 is in the initial position thereof, the CCD 65 is provided with a pair of X-axis-direction edges (upper and lower X-axis-direction edges) 65X which extend parallel to each other in the X-axis direction and a pair of Y-axis-direction edges (right and left Y-axis-direction edges) 65Y which extend parallel to each other in the Y-axis direction. A CCD holder 67 which surrounds the CCD 65 is fixed to the front of the electrical board 60 in an airtight fashion (dust-tight fashion). The CCD holder 67 is provided on a front wall thereof with an aperture 68 having a rectangular shape as viewed from the front of the camera shake correction apparatus 30. An optical low-pass filter 69 is installed in the internal space of the CCD holder 67 to be fixedly fitted therein between the front wall of the CCD holder 67 and the CCD 65. The space between the optical low-pass filter 69 and the front wall of the CCD holder 67 is maintained in an air-tight state. An imaging surface 66 of the CCD 65 faces the optical low-pass filter 69. The CCD 65, the optical low-pass filter 69, the aperture 68 and the infrared-cut filter 34 are aligned in the forward/rearward direction at all times. Object light which is passed through the lenses L1, L2 and L3, the infrared-cut filter 34 and the optical low-pass filter 69, is formed as an object image on the imaging surface 66 of the CCD 65. When the electrical board 60 is in the initial position (when the electrical board 60 is in the state shown in FIG. 2), the center of the imaging surface 66 of the CCD 65 is positioned on the optical axis O.

The imaging surface 66 of the CCD 65 must be orthogonal to the optical axis O at all times. Therefore, before the camera shake correction apparatus 30 is fixed to the camera body of the digital camera 20 before the completion of final assembly of the digital camera 20, the angle of inclination of the movable stage 62 relative to the front stationary support board 31 or the rear stationary support board 32 and the axial position of the movable stage 62 in the optical axis direction (in the direction of the optical axis O) are adjusted using an adjusting screwdriver (not shown). Namely, the angle of inclination of the of the electrical board 60 and the reinforcing plate 61 relative to the front stationary support board 31 and the rear stationary support board 32 and the axial position of the same combination in the optical axis direction are adjusted.

Specifically, first of all, one or more adjusting members 48 are rotated using a flat blade screwdriver (not shown) with the insertion end thereof being inserted into the screwdriver insertion slot 53 of each adjusting member 48 to adjust the angle of inclination of the movable stage 62 relative to the front stationary support board 31 and the rear stationary support board 32, and the axial position of the movable stage 62 in the optical axis direction. Subsequently, one or more adjusting members 41 to be adjusted are rotated with the use of a flat blade screwdriver (not shown) to adjust the biasing force of one or more of the four balls 44, which is produced by the associated compression coil springs S, against the electrical board 60 of the movable stage 62 so that the contact pressures of the four balls 44 against the front surface of the electrical board 60 of the movable stage 62 at four points thereon becomes mutually identical. This adjustment makes a smooth movement of the movable stage 62 relative to the front stationary support board 31 and the rear stationary support board 32 possible. Such adjusting operations (the inclination angle adjusting operation and the axial position adjusting operation) using screw driver are performed while a visual image which is captured by the imaging surface 66 of the CCD 65 and indicated on a display monitor (not shown) is visually checked so that a state of the visual image indicated on the display monitor becomes a desired state.

The camera shake correction apparatus 30 to which both the inclination angle adjusting operation and the axial position adjusting operation have been made is fixed to an inner surface of the camera body of the digital camera 20 by screwing the three set screws 35 into the aforementioned three female screw holes (not shown) that are formed on an inner surface of the camera body of the digital camera 20, respectively, with the front stationary support board 31 being made contact with a reference mounting surface (not shown) formed on an inner surface of the camera body of the digital camera 20. Thereupon, the imaging surface 66 of the CCD 65 becomes orthogonal to the optical axis O.

As shown in FIG. 2, the electrical board 60 is provided at horizontally opposite ends thereof with a right tongue portion 71 and a left tongue portion 72 which extend rightward and leftward, respectively, and is further provided at a lower end of the electrical board 60 with a lower tongue portion 73 which extends downward.

Figure 8:
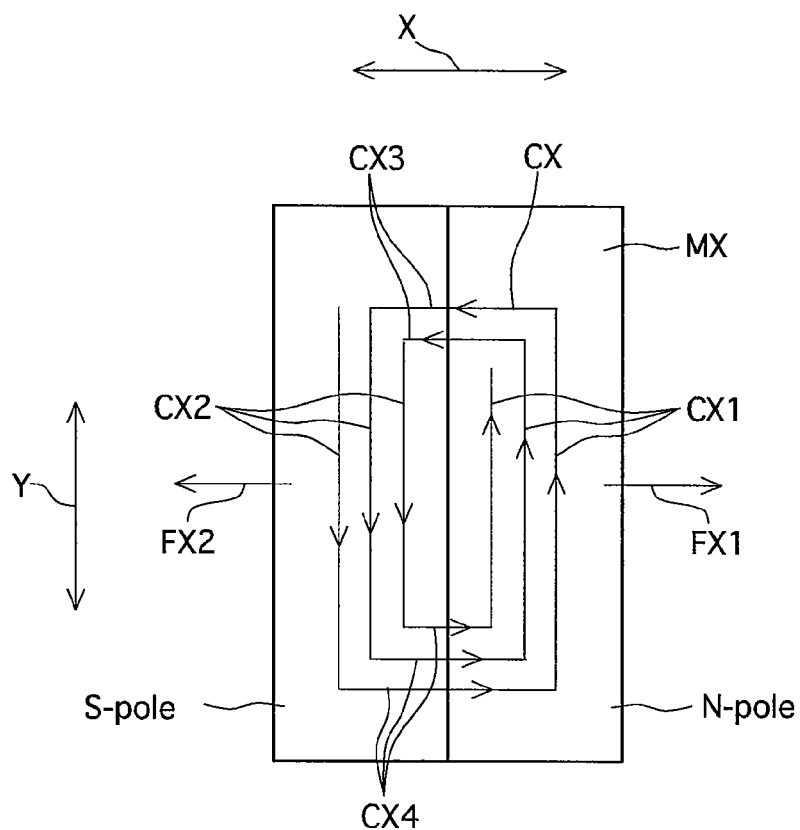
FIG. 8 is a schematic diagram of an X-axis-direction drive coil and an associated X-axis-direction magnet of an X-axis-direction driving device.

The right tongue portion 71 and the left tongue portion 72 are positioned to correspond to the aforementioned two X-axis-direction magnetic circuits, respectively (i.e., positioned to face the two X-axis-direction magnets MX in the forward/rearward direction, respectively). Two planar X-axis-direction drive coils (X-axis-direction driver) CX having the same specifications are printed on the front surfaces of the right tongue portion 71 and the left tongue portion 72, respectively. The two X-axis-direction drive coils CX lie in a plane parallel to an X-Y axis plane and are aligned in a direction parallel to the pair of X-axis-direction edges 65X of the CCD 65 (in the X-axis direction in the state shown in FIG. 2). In other words, the positions of the two X-axis-direction drive coils CX in the direction parallel to the pair of Y-axis-direction edges 65Y (in the Y-axis direction in the state shown in FIG. 2) are coincident with each other. As shown in FIGS. 2 and 8, each X-axis direction drive coil CX is rectangularly coiled and is defined by linear right sides CX1, linear left sides CX2, linear upper sides CX3 and linear lower sides CX4. The linear right sides CX1 and the linear left sides CX2 are parallel to the pair of Y-axis-direction edges 65Y and the linear upper sides CX3 and the linear lower sides CX4 are parallel to the pair of X-axis-direction edges 65X. Although each X-axis direction drive coil CX has several turns in the drawings, in practice there are several scores of turns. The two X-axis direction drive coils CX and the aforementioned two X-axis-direction magnetic circuits (the front stationary support board 31, the rear stationary support board 32 and the two X-axis-direction magnets MX) constitute an X-axis-direction driving device.

Due to the function of the aforementioned moving range limiting device (not shown), the linear right sides CX1 of each X-axis direction drive coil CX remain opposed to the N-pole of the associated magnet MX in a Z-axis direction (shown by an arrow Z in FIG. 1; i.e., the optical axis direction) while the linear left sides CX2 of each X-axis direction drive coil CX remain opposed to the S-pole of the associated magnet MX in the Z-axis direction.

An X-axis direction Hall element SX is fixed to a front surface of the right tongue portion 71 in the vicinity of the right X-axis direction drive coil CX. Variations in position of the right X-axis direction drive coil CX in the X-axis direction are detected by the X-axis direction Hall element SX. Variations in position of the left X-axis direction drive coil CX in the X-axis direction are simultaneously detected by the X-axis direction Hall element SX because variations in position of the left X-axis direction drive coil CX in the X-axis direction correspond to those of the right X-axis direction drive coil CX. The X-axis direction Hall element SX is adopted to detect variations in position of the two X-axis direction drive coils CX in the X-axis direction by detecting variations in magnetic flux produced by the right X-axis-direction magnetic circuit.

For instance, if an electric current is supplied to each X-axis direction drive coil CX in a specific direction (counterclockwise direction) shown by arrows in FIG. 8, a linear force in a direction FX1 (see FIGS. 2 and 8) is produced in the linear right sides CX1 and the linear left sides CX2 of each X-axis direction drive coil CX. Both the direction FX1 and the direction FX2 shown in FIG. 8 in each X-axis direction drive coil CX that are shown in FIGS. 2 and 8 are orthogonal to the linear right sides CX1 and the linear left sides CX2 (i.e., parallel to the pair of X-axis-direction edges 65X of the CCD 65) and are defined based on the X-axis direction drive coil CX. When the movable stage 62 is in the initial position shown in FIG. 2, the direction FX1 and the direction FX2 coincide with the X-axis direction; however, the direction FX1 and the direction FX2 do not coincide with the X-axis direction if the movable stage 62 rotates relative to the front stationary support board 31. If the linear force in the direction FX1 is produced in each X-axis direction drive coil CX, the movable stage 62 moves linearly in the direction FX1 relative to the first stationary support board 31. Note that forces are produced also in the linear upper sides CX3 and the linear lower sides CX4 at this time; however, these forces cancel each other out, thus being not exerted on the movable stage 62.

On the other hand, if an electric current is supplied to each X-axis direction drive coil CX in the direction (clockwise direction) opposite to the direction shown by the arrows in FIG. 8, a linear force in the direction FX2 is produced in the linear right sides CX1 and the linear left sides CX2 of each X-axis direction drive coil CX, so that the movable stage 62 moves linearly in the direction FX2 relative to the first stationary support board 31.

By adjusting the direction of the electric current supplied to each X-axis-direction drive coil CX in the above described manner, the movable stage 62 moves linearly in the direction FX1 or the direction FX2 within a range of movement in which the linear right sides CX1 of each X-axis direction drive coil CX remain opposed to the N-pole of the associated magnet MX in the Z-axis direction while the linear left sides CX2 of each X-axis direction drive coil CX remain opposed to the S-pole of the associated magnet MX in the Z-axis direction.

Moreover, as soon as the supply of the electric current to each X-axis-direction drive coil CX is stopped, the movement of the movable stage 62 in the X-axis direction is stopped due to absence of the linear force in the direction FX1 or FX2. Since the magnitude of the electric current supplied to each X-axis-direction drive coil CX is proportional to the magnitude of the linear force in the direction FX1 or FX2 which is produced by the electric current supplied to each X-axis-direction drive coil CX, the linear force in the direction FX1 or FX2 that is applied to each X-axis-direction drive coil CX is increased or reduced by increasing or reducing the electric current supplied to each X-axis-direction drive coil CX, respectively.

Figure 9:
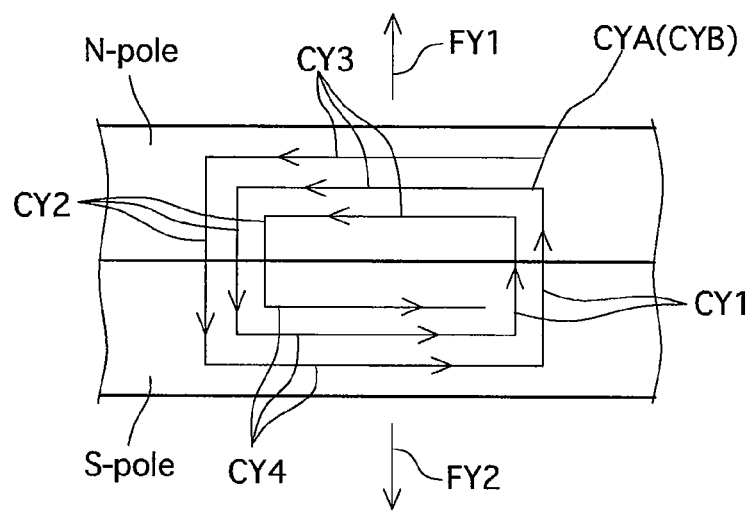
FIG. 9 is a schematic diagram of a Y-axis-direction drive coil and a Y-axis-direction magnet of a Y-axis-direction driving device.

As shown in FIGS. 4 through 6, the lower tongue portion 73 is positioned to correspond to the aforementioned two Y-axis-direction magnetic circuits, respectively (i.e., positioned to face the two Y-axis-direction magnets MY in the forward/rearward direction, respectively). Two planar Y-axis-direction drive coils (Y-axis-direction driver) CYA and CYB having the same specifications are printed on the front surface of the lower tongue portion 73. The two Y-axis-direction drive coils CYA and CYB lie in a plane parallel to an X-Y axis plane and are aligned along the lower X-axis-direction edge 65X of the CCD 65 (in the X-axis direction in the state shown in FIG. 2). In other words, the positions of the two Y-axis-direction drive coils CYA and CYB in the direction parallel to the pair of Y-axis-direction edges 65Y (in the Y-axis direction in the state shown in FIG. 2) are coincident with each other. As shown in FIGS. 2 and 9, each of the two Y-axis direction drive coils CYA and CYB is rectangularly coiled and is defined by linear right sides CY1, linear left sides CY2, linear upper sides CY3 and linear lower sides CY4. The linear right sides CY1 and the linear left sides CY2 are parallel to the pair of Y-axis-direction edges 65Y and the linear upper sides CY3 and linear lower sides CY4 are parallel to the pair of X-axis-direction edges 65X. Although each of the two Y-axis direction drive coils CYA and CYB has several turns in the drawings, in practice there are several scores of turns. The two Y-axis direction drive coils CYA and CYB and the aforementioned two Y-axis-direction magnetic circuits (the front stationary support board 31, the rear stationary support board 32 and the two Y-axis-direction magnets MY) constitute a Y-axis-direction driving device.

Due to the function of the aforementioned moving range limiting device (not shown), the linear upper sides CY3 of each Y-axis direction drive coil CY remain opposed to the N-pole of the associated magnet MY in the Z-axis direction while the linear lower sides CY4 of each Y-axis direction drive coil CY remain opposed to the S-pole of the associated magnet MY in the Z-axis direction.

A left Y-axis direction Hall element (Y-axis-direction positional variation detecting sensor) SYA and a right Y-axis direction Hall element (Y-axis-direction positional variation detecting sensor) SYB are fixed to a front surface of the lower tongue portion 73 in the vicinity of the left side of the left Y-axis-direction drive coil CYA and the right side of the right Y-axis-direction drive coil CYB, respectively. The left Y-axis direction Hall element SYA is adopted to detect variations in position of the left Y-axis direction drive coil CYA in the Y-axis direction by detecting variations in magnetic flux produced between the left Y-axis-direction magnet MY and the rear stationary support board 32, while the right Y-axis direction Hall element SYB is adopted to detect variations in position of the right Y-axis direction drive coil CYB in the Y-axis direction by detecting variations in magnetic flux produced between the right Y-axis-direction magnet MY and the rear stationary support board 32.

For instance, if the two Y-axis direction drive coils CYA and CYB are respectively supplied with the same amounts of electric currents in a specific direction (counterclockwise direction) shown by arrows in FIG. 9, a linear force in a direction FY1 (see FIGS. 2 and 9) is produced in the linear upper sides CY3 and the linear lower sides CY4 of each of the two Y-axis direction drive coils CYA and CYB. Both the direction FY1 and the direction FY2 that are shown in FIGS. 2 and 9 are orthogonal to the linear upper sides CY3 and the linear lower sides CY4 and are defined based on the two Y-axis-direction drive coils CYA and CYB. When the movable stage 62 is in the initial position as shown in FIG. 2, the direction FY1 and the direction FY2 coincide with the Y-axis direction; however, the direction FY1 and the direction FY2 do not coincide with the Y-axis direction if the movable stage 62 rotates relative to the front stationary support board 31. If the amounts of electric current which are respectively supplied to the two Y-axis direction drive coils CYA and CYB are made equal to each other, the magnitude of the linear force in the direction FY1 produced in the left Y-axis direction drive coil CYA and the magnitude of the linear force in the direction FY1 produced in the right Y-axis direction drive coil CYB become identical to each other, and accordingly, the movable stage 62 moves linearly in the direction FY1 relative to the first stationary support board 31. Note that forces are produced also in the linear right sides CY1 and the linear left sides CY2 at this time; however, these forces cancel each other out, and hence are not exerted on the movable stage 62.

On the other hand, if the two Y-axis direction drive coils CYA and CYB are respectively supplied with the same amounts of electric current in the direction (clockwise direction) opposite to the direction shown by the arrows shown in FIG. 9, a linear force in the direction FY2 is produced in the linear upper sides CY3 and the linear lower sides CY4 of the left Y-axis direction drive coil CYA while a linear force in the direction FY2 is produced in the linear upper sides CY3 and the linear lower sides CY4 of the right Y-axis direction drive coil CYB, wherein the former linear force and the latter linear force are identical in magnitude to each other. Due to these two linear forces in the direction FY2, the movable stage 62 moves linearly in the direction FY2 relative to the first stationary support board 31.

By adjusting the direction of the electric current supplied to each of the two Y-axis-direction drive coils CYA and CYB in the above described manner, the movable stage 62 moves linearly in the direction FY1 or the direction FY2.

Moreover, as soon as the supply of the electric current to each of the two Y-axis direction drive coils CYA and CYB is stopped, the movement of the movable stage 62 in the Y-axis direction is stopped due to absence of the linear force in the direction FY1 or FY2. The linear force in the direction FY1 or FY2 that is applied to the left Y-axis direction drive coil CYA is increased or reduced by increasing or reducing the electric current supplied to the left Y-axis direction drive coil CYA, respectively, since the magnitude of the electric current supplied to the left Y-axis direction drive coil CYA is proportional to the magnitude of the linear force in the direction FY1 or FY2 which is produced by the electric current supplied to the left Y-axis direction drive coil CYA. Likewise, the linear force in the direction FY1 or FY2 that is applied to the right Y-axis direction drive coil CYB is increased or reduced by increasing or reducing the electric current supplied to the right Y-axis direction drive coil CYB, respectively, since the magnitude of the electric current supplied to the right Y-axis direction drive coil CYB is proportional to the magnitude of the linear force in the direction FY1 or FY2 which is produced by the electric current supplied to the right Y-axis direction drive coil CYB.

If the directions of electric current supplied to the two Y-axis direction drive coils CYA and CYB are made opposite to each other, a force in the direction FY1 is produced in one of the two Y-axis direction drive coils CYA and CYB while a force in the direction FY2 is produced in the other of the two Y-axis direction drive coils CYA and CYB. Consequently, the movable stage 62 rotates relative to the front stationary support board 31. Note that both the linear movement and the rotational movement of the movable stage 62 can be controlled simultaneously by adjusting the magnitudes of electric current supplied to the two Y-axis direction drive coils CYA and CYB.

Figure 10:
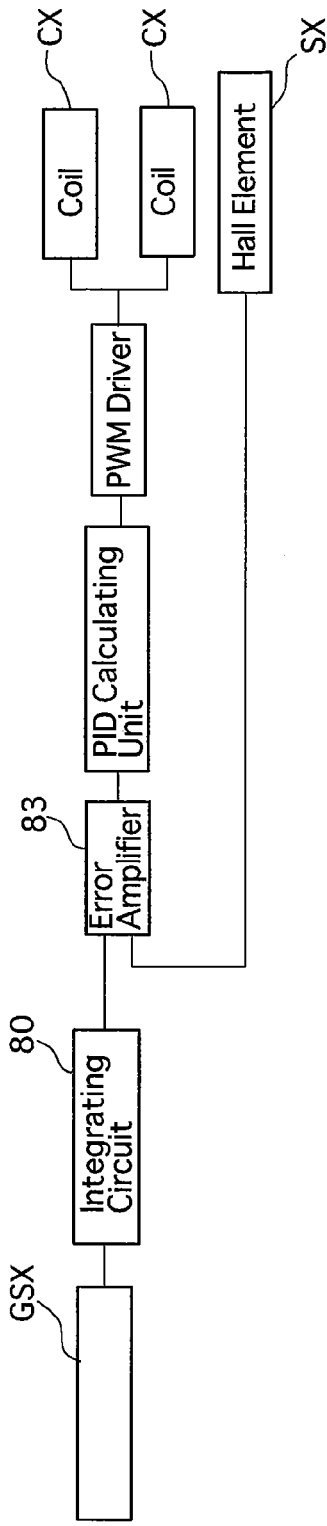
FIG. 10 is a block diagram of a control circuit for performing an X-axis-direction camera shake correction operation.

Operations of the camera shake correction apparatus 30 will be hereinafter discussed with reference to the block diagrams shown in FIGS. 10 and 11. The two X-axis direction drive coils CX and the two Y-axis direction drive coils CYA and CYB are electrically connected to a common controller including the following elements shown in FIGS. 10 and 11: three integrating circuits 80, 81 and 82, three error amplifiers 83, 84 and 85, three PID calculating units, and three PWM drivers.

Upon the occurrence of camera shake caused by hand shake of a photographer while holding the digital camera 20 by his or her hand(s), angular deflections of the digital camera 20 (angular deflections of the optical axis O in the X-axis direction and the Y-axis direction) and rotational deflections of the digital camera 20 (rotational deflections about the optical axis O in an X-Y axis plane) occur, which causes image shake. The camera shake correction apparatus 30 performs a shake correction operation (image stabilizing operation) so as to offset this image shake.

Angular deflections of the optical axis O are detected as two separate components: the X-axis-direction component and the Y-axis-direction component by an X-axis-direction angular velocity sensor GSX and a Y-axis-direction angular velocity sensor GSY which are incorporated in the digital camera 20, respectively. The X-axis-direction angular velocity sensor GSX operates to detect the angular velocity in the X-axis direction with the optical axis O at its center, and the Y-axis-direction angular velocity sensor GSY operates to detect the angular velocity in the Y-axis direction with the optical axis O at its center. Additionally, rotational deflections about the optical axis O are detected by a rotation-direction angular velocity sensor RGS which is incorporated in the digital camera 20. The rotation-direction angular velocity sensor RGS operates to detect the angular velocity about the optical axis.

A shake correction operation for offsetting image shake caused by angular deflections of the optical axis O in the X-axis direction and the Y-axis direction will be discussed hereinafter.

In a photographing operation carried out by the digital camera 20, light transmitted through the lenses L1 through L3 is converged onto the imaging surface 66 of the CCD 65 through the infrared-cut filter 34 and the optical low-pass filter 69 to be formed as an image on the imaging surface 66. If a photographing operation is carried out with a camera shake correction switch SW (see FIG. 1) of the digital camera 20 being turned ON, an output value of the X-axis-direction angular velocity sensor GSX and an output value of the Y-axis-direction angular velocity sensor GSY are integrated by the integrating circuits (elements of the controller) 80 and 81 to be converted into an X-axis-direction deflection amount and a Y-axis-direction deflection amount, respectively, upon the occurrence of angular deflections of the digital camera 20 in the X-axis direction and the Y-axis direction. Subsequently, the output value of the integrating circuit 80 (deflection amount of the digital camera 20 in the X-axis direction) to the error amplifier (an element of the controller) 83 and the output value of the X-axis-direction Hall element SX (the amount of movement of the CCD 65 (the X-axis-direction drive coils CX) relative to the digital camera 20 in the X-axis direction) are compared with each other in the error amplifier 83. In addition, a PID calculation is performed on the output value of the error amplifier 83, and the PWM driver applies a voltage to each X-axis-direction drive coil CX, wherein this voltage corresponds to an output difference between an output of the integrating circuit 80 to the error amplifier 83 and an output of the X-axis-direction Hall element SX to the error amplifier 83. Thereupon, the CCD 65 (together with the movable stage 62) is driven in the direction FX1 or FX2 relative to the front stationary support board 31 and the rear stationary support board 32 in a manner to reduce the output difference.

Similarly, the output value of the integrating circuit 81 (deflection amount of the digital camera 20 in the Y-axis direction) and the output value of the Y-axis-direction Hall element SYA (the amount of movement of the Y-axis-direction drive coils CYA relative to the digital camera 20 in the Y-axis direction) are compared with each other in the error amplifier (an element of the controller) 84, while the output value of the integrating circuit 81 (deflection amount of the digital camera 20 in the Y-axis direction) and the output value of the Y-axis-direction Hall element SYB (the amount of movement of the Y-axis-direction drive coils CYB relative to the digital camera 20 in the Y-axis direction) are compared with each other in the error amplifier (an element of the controller) 85. Subsequently, a PID calculation is performed on each of the output value of the error amplifier 84 and the output value of the error amplifier 85. Additionally, the PWM driver for the left Y-axis-direction drive coil CYA applies a voltage which corresponds to an output difference between the integrating circuit 81 and the Y-axis-direction Hall element SYA, while the PWM driver for the right Y-axis-direction drive coil CYB applies a voltage which corresponds to an output difference between the integrating circuit 81 and the Y-axis-direction Hall element SYB. The direction and the magnitude of the voltage applied to the left Y-axis-direction drive coil CYA and the direction and the magnitude of the voltage applied to the right Y-axis-direction drive coil CYB at this time are identical. Thereupon, the CCD 65 (integral with the movable stage 62) is driven in the direction FY1 or FY2 relative to the front stationary support board 31 and the rear stationary support board 32 in a manner to reduce the output difference by a driving force in the direction FY1 or FY2 produced by the two Y-axis-direction drive coils CYA and CYB.

In this manner, image shake on the CCD 65 caused by hand shake is corrected by driving the CCD 65 (integral with the movable stage 62) linearly in the directions FX1 (or FX2) and FY1 (or FY2) in response to the amount of angular deflections of the optical axis O caused by the hand shake. During this linear movement of the CCD 65 in the directions FX1 (or FX2) and FY1 (or FY2), the imaging surface 66 of the CCD 65 remains orthogonal to the optical axis O at all times.

A shake correction operation for offsetting image shake caused by rotational deflections about the optical axis O will be discussed hereinafter.

If a photographing operation is carried out with a camera shake correction switch SW (see FIG. 1) of the digital camera 20 being turned ON, an output value of the rotation-direction angular velocity sensor RGS is integrated by the integrating circuit (an element of the controller) 82 to be converted into a rotation-direction deflection amount on an X-Y axis plane upon the occurrence of rotational deflections of the digital camera 20 about the optical axis O. Thereupon, a plus signal and a minus signal are sent to the error amplifiers 84 and 85, respectively, in accordance with the output value of the integrating circuit 82 (rotational deflection amount of the CCD 65). Additionally, the output value of the integrating circuit 82 to the error amplifier 84 and the output value of the Y-axis-direction Hall element SYA are compared with each other in the error amplifier 84, while the output value of the integrating circuit 82 to the error amplifier 85 and the output value of the Y-axis-direction Hall element SYB are compared with each other in the error amplifier 85. In addition, a PID calculation is performed on the output value of the error amplifier 84, and the associated PWM driver applies a voltage to the Y-axis-direction drive coil CYA in a manner to reduce an output difference between an output of the integrating circuit 82 to the error amplifier 84 and an output of the Y-axis-direction Hall element SYA to the error amplifier 84. Simultaneously, a PID calculation is performed on the output value of the error amplifier 85, and the associated PWM driver applies a voltage to the Y-axis-direction drive coil CYB in a manner to reduce an output difference between an output of the integrating circuit 82 to the error amplifier 85 and an output of the Y-axis-direction Hall element SYB to the error amplifier 85. Thereupon, a driving force in the direction FY1 and a driving force in the direction FY2 are produced by one and the other of the two Y-axis-direction drive coils CYA and CYB, respectively, and therefore, the CCD 65 (integral with the movable stage 62) rotates about the optical axis O relative to the digital camera 20 (relative to the front stationary support board 31 and the rear stationary support board 32) to offset image shake caused by rotational deflections of the digital camera 20.

In the above described embodiment of the camera shake correction apparatus 30, in which the movable stage 62 that supports the CCD 65 is movable linearly in the X-axis direction and the Y-axis direction and rotatable in an X-Y axis plane, the angle of inclination of movable stage 62 relative to the front stationary support board 31 and the rear stationary support board 32 can be easily adjusted and maintained at a desired angle of inclination. Therefore, the imaging surface 66 of the CCD 65 can be easily made to be orthogonal to the optical axis O only by mounting the camera shake correction apparatus 30 to the aforementioned reference mounting surface (not shown), which is formed on an inner surface of the camera body of the digital camera 20, after the angle of inclination and the axial position of the movable stage 62 have been adjusted inside of the camera shake correction apparatus 30 that is constructed as a unit.

It is conceivable for the imaging surface 66 of the CCD 65 to be made orthogonal to the optical axis O by adjusting the angle of inclination of the entire camera shake correction apparatus 30 relative to the camera body of the digital camera 20 instead of adjusting the angle of inclination of the movable stage 62 relative to the front stationary support board 31 and the rear stationary support board 32. However, since the outer edges of the front stationary support board 31 and the rear stationary support board 32 move in the forward/rearward direction during adjustment thereof, the camera body needs to be provided therein with space having at least a thickness in the forward/rearward direction which corresponds to the maximum range of movement of the outer edges of the front stationary support board 31 and the rear stationary support board 32 in the forward/rearward direction. However, according to the above described manner of adjustment in which the movable stage 62 is tilted for adjustment relative to the front stationary support board 31 and the rear stationary support board 32, the range of movement of the outer edges of the movable stage 62 (the electrical board 60 and the reinforcing plate 61) in the forward/rearward direction becomes smaller than the aforementioned range of movement of the front stationary support board 31 and the rear stationary support board 32 in the forward/rearward direction since the movable stage 62, which is smaller in dimensions than the front stationary support board 31 and the rear stationary support board 32, is tilted. Therefore, it is not necessary to secure a large space between the front stationary support board 31 and the rear stationary support board 32 in the forward/rearward direction, which makes it possible to reduce the thickness of the camera body in the forward/rearward direction by a greater amount than the case where the front stationary support board 31 and the rear stationary support board 32 are tilted for adjustment.

Each of the two X-axis-direction drive coils CX and the two Y-X-axis-direction drive coils CYA and CYB is a planar coil lying in a plane parallel to the X-axis direction and the Y-axis direction. Accordingly, if the number of turns of each of the four drive coils CX, CYA and CYB is increased to obtain a greater driving force, each of X-axis-direction drive coil CX expands in the directions FX1 and FX2 while each Y-axis-direction drive coil CYA and CYB expands in the directions FY1 and FY2. However, even if the number of turns thereof is increased, the thickness of each of the four drive coils CX, CYA and CYB does not increase in the forward/rearward direction, so that the dimensions of the movable stage 62 does not increase in the optical axis direction, which does not increase the size of the digital camera 20 in the optical axis direction.

The adjusting device for adjusting the angle of inclination of the movable stage 62 is not limited solely to the particular embodiment described above; making various modifications to the adjusting device is possible. For example, the adjusting device can be modified as shown in FIGS. 12 and 13.

Figure 12:
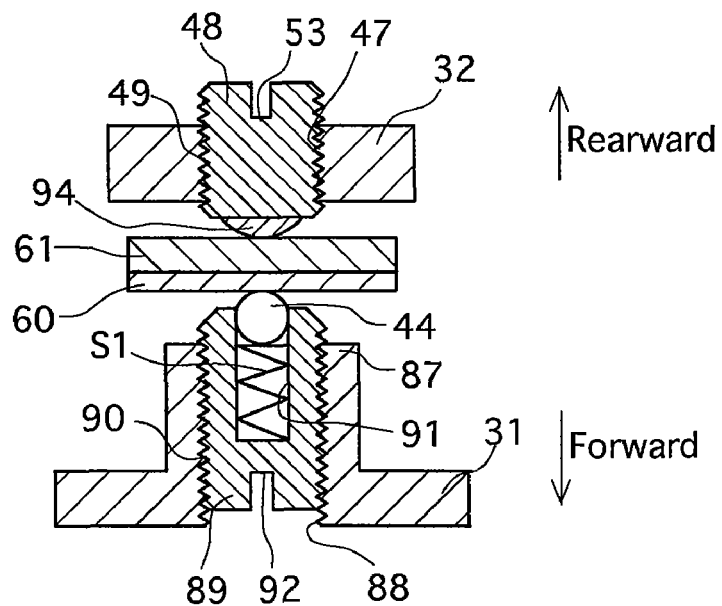
FIG. 12 is a view similar to that of FIG. 7 and illustrates a modification of an adjusting device.

In the modification shown in FIG. 12, the front stationary support board 31 is provided with four cylindrical support projections 87 (instead of the four cylindrical support projections 38 shown in FIG. 7) which project rearward from the rear surface of the front stationary support board 31 at four positions thereon. The four cylindrical support projections 87 have larger diameters than the four cylindrical support projections 38. Four female screw holes (elements of the biasing force adjusting device/elements of a second female screw hole) 88 are formed in the four cylindrical support projections 87 as four through holes extending therethrough and through the front stationary support board 31 in the forward/rearward direction, respectively, and an adjusting member (second male screw member/an element of the biasing force adjusting device) 89 including a male thread 90 threaded on the entire outer peripheral surface is screwed into the female screw hole 88 of each cylindrical support projection 87 and also the front stationary support board 31 so that the position of each adjusting member 89 relative to the associated cylindrical support projection 87 in the forward/rearward direction can be adjusted. Each adjusting member 89 is provided at a rear portion and a front portion thereof with a spring accommodation hole 91 and a screwdriver insertion slot (recess) 92, respectively. A compression coil spring (an element of the biasing force adjusting device/biasing device) S1 is installed in each spring accommodation hole 91 so that the front end of the compression coil spring S1 is fixed to the bottom of the associated spring accommodation hole 91. Four metal balls (second support member) 44 are partly accommodated in the spring accommodation holes 91 of the four adjusting members 89 to be freely rotatable and slidable therein, respectively. The four balls 44 are continuously biased rearward, toward the electrical board 60 (of the movable stage 62), by the rear ends of the four compression coil springs S1, respectively, to be in contact with the front surface of the electrical board 60 to be rotatable and slidable thereon at all times. Each adjusting member 48 shown in FIG. 12 is provided at the front end thereof with a dome-shaped sliding protrusion (first support member) 94 (instead of the recess 51 with the ball 52 therein shown in FIG. 7). The outside shape of the sliding protrusion 94 is spherical. The front end of the sliding protrusion 94 is in sliding contact with the rear surface of the reinforcing plate 61 of the movable stage 62.

In the modification shown in FIG. 12 that has the above described structure, the angle of inclination and the axial position of the movable stage 62 relative to the front stationary support board 31 and the rear stationary support board 32 can be adjusted by adjusting the amount of screw-engagement of each adjusting member 48 with the associated female screw hole 47 and the amount of screw-engagement of each adjusting member 89 with the associated female screw hole 88 using a screw driver.

Figure 13:
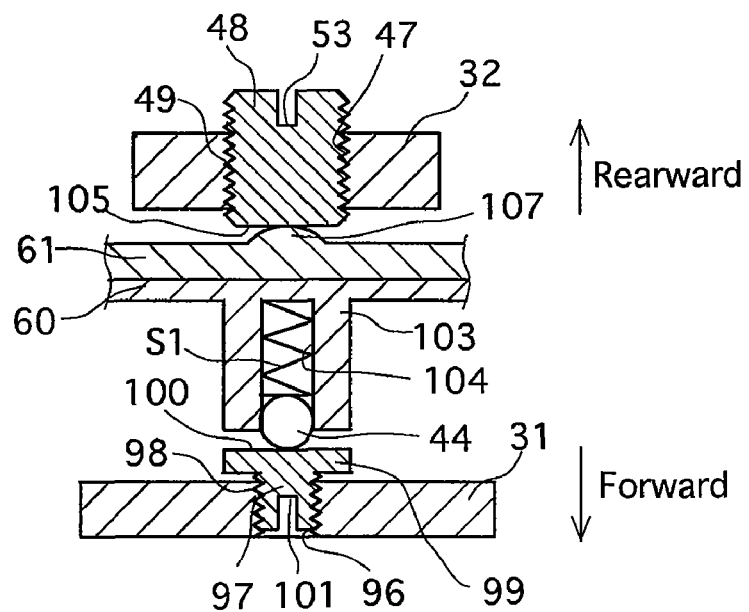
FIG. 13 is a view similar to that of FIG. 7 and illustrates another modification of the adjusting device.

In the modification shown in FIG. 13, the front stationary support board 31 is provided at four positions thereof with four female screw holes (second female screw holes/through holes) 96, respectively. An adjusting member (second male screw member) 97 (this adjusting member is included in the first stationary support board 31 in the claims) which includes a male thread 98 is screwed into each female screw hole 96. Each adjusting member 97 is provided at the rear end thereof with a large-diameter disc portion 99 having a greater diameter than the associated female screw hole 96. The rear end surface of the disc portion 99 is parallel to the front stationary support board 31 and serves as a contacting surface 100. Each adjusting member 97 is provided in a front end surface thereof with a screwdriver insertion slot (recess) 101. The electrical board 60 of the movable stage 62 is provided, on the front surface thereof at four positions thereon, with four cylindrical support projections 103 which project forward to correspond to the four adjusting members 97, respectively. The four cylindrical support projections 103 are provided with four spring accommodation holes (elements of the biasing force adjusting device) 104 which are bored from the front surfaces of the four cylindrical support projections 103 to extend rearward, respectively. A compression coil spring S1 is installed in each spring accommodation hole 104 so that the rear end of the compression coil spring S1 is fixed to the bottom of the spring accommodation hole 104. Four metal balls 44 are partly accommodated in the spring accommodation holes 104 of the four adjusting members 103 to be freely rotatable and slidable therein. The four balls 44 are continuously biased forward, toward the contacting surfaces 100 of the four adjusting members 97, by the front ends of the four compression coil springs S1 to be in contact with the contacting surfaces 100 of the four adjusting members 97 to be rotatable and slidable thereon at all times, respectively. Each adjusting member 48 in the modification shown in FIG. 13 is provided at a front end thereof with a contacting surface 105 which is parallel to the rear stationary support board 32. Additionally, the reinforcing plate 61 of the movable stage 62 is provided, on a rear surface thereof at four positions thereon, with four dome-shaped sliding protrusions 107 which protrude rearward, respectively. The outside shape of each sliding protrusion 107 is spherical. The rear ends of the four sliding protrusions 107 are in sliding contact with the contacting surfaces 105 of the four adjusting members 48, respectively.

In the modification shown in FIG. 13 that has the above described structure, the angle of inclination and the axial position of the movable stage 62 relative to the front stationary support board 31 and the rear stationary support board 32 can be adjusted by adjusting the amount of screw-engagement of each adjusting member 48 with the associated female screw hole 47 and the amount of screw-engagement of each adjusting member 97 with the associated female screw hole 96 using a screw driver.

Although the present invention has been discussed above with reference to the specific embodiments (which include modifications thereof) described above, the present invention is not limited solely thereto; various changes can be made in these specific embodiments thereof.

Although the aforementioned spherical shaped contacting members (the balls 44, the balls 52, the sliding protrusions 94 and the sliding protrusions 107) are made to come in contact with a contacting flat surface or surfaces (the electrical board 60, the reinforcing plate 61, the contacting surfaces 100 and the contacting surfaces 105) in the above described embodiments, contacting members having a shape other than a spherical shape can be made to come in contact with such contacting flat surfaces. In addition, spring devices other than the compression coil springs S1 or rubber members can be used as biasing devices.

Although the rear stationary support board 32 and the front stationary support board 31 serve as the first stationary support board and the second stationary support board, respectively, in the above described embodiments, it is possible that the rear stationary support board 32 and the front stationary support board 31 be made to serve as the second stationary support board and the first stationary support board, respectively. Additionally, the number of the first support members such as the balls 52 and the sliding protrusions 94 and the number of the second support members such as the balls 44 are not limited solely to four, but can be three or more.

The first support members such as the balls 52 and the sliding protrusions 94 can be made to come in contact with the front surface of the rear stationary support board 32 by providing the movable stage 62 with four female screw holes corresponding to the four female screw holes 47 in which the four adjusting members 48 are screw-engaged, respectively.

The balls 44 which are supported by the compression coil springs S1 can be made to come in contact with the rear surface of the front stationary support board 31 by providing the movable stage 62 with the compression coil springs S1 and four female screw holes corresponding to the four female screw holes 40 or the four female screw holes 88 in which the adjusting members 41 or the adjusting members 89 are screw-engaged, respectively.

It is possible for four female screw holes corresponding to the four female screw holes 96 to be formed in the movable stage 62, for the four adjusting members 97 having the male threads 98 to be respectively screwed into these four female screw holes, and for the four compression coil springs S1 to be supported by the front stationary support board 31 to make the four balls 44 come in contact with the front surface of the electrical board 60 by the spring forces of the four compression coil springs S1, respectively.

Figure 14:
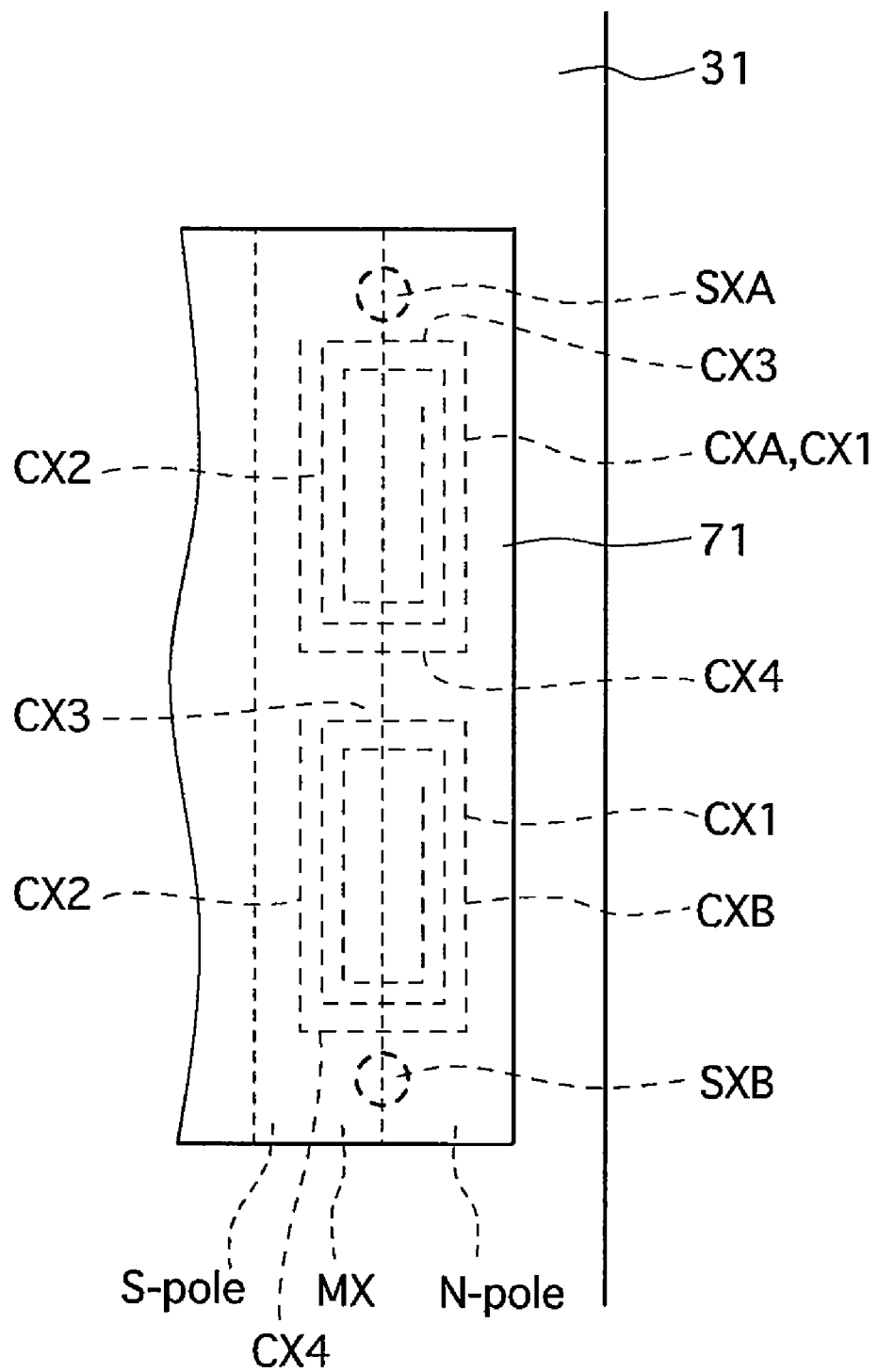
FIG. 14 is a rear elevational view of a modification of the camera shake correction apparatus in which the placement of the X-axis-direction drive coils is different from that in the camera shake correction apparatus shown in FIG. 2.

It is possible to rotate the movable stage 62 relative to the front stationary support board 31 and the second stationary support board 32 to offset image shake caused by rotational deflections about the optical axis O by the operations of a plurality of X-axis direction drive coils CX. In this case, as shown in FIG. 14, two planar X-axis-direction drive coils (X-axis-direction driver) CXA and CXB (which are the same as the two X-axis-direction drive coils CX in structure) are printed on the front surface of the right tongue portion 71 (or the left tongue portion 72) of the electrical board 60 to be both positioned on the right side (or the left side) of the CCD 65 (on the right side of the CCD 65 in the particular embodiment shown in FIG. 14). The two X-axis-direction drive coils CXA and CXB lie in a plane parallel to an X-Y axis plane and are aligned along the direction of the two Y-axis-direction edges 65Y of the CCD 65 (not shown in FIG. 14). An X-axis direction Hall element SXA for detecting variations in position of the upper X-axis direction drive coil CXA in the X-axis direction is fixed to the electrical board 60 (the right tongue portion 71) at a position thereon immediately above (in the vicinity of) the upper X-axis-direction drive coil CXA, while an X-axis direction Hall element SXB for detecting variations in position of the lower X-axis direction drive coil CXB in the X-axis direction is fixed to the electrical board 60 (the right tongue portion 71) at a position thereon immediately below (in the vicinity of) the lower X-axis-direction drive coil CXB.

Figure 15:
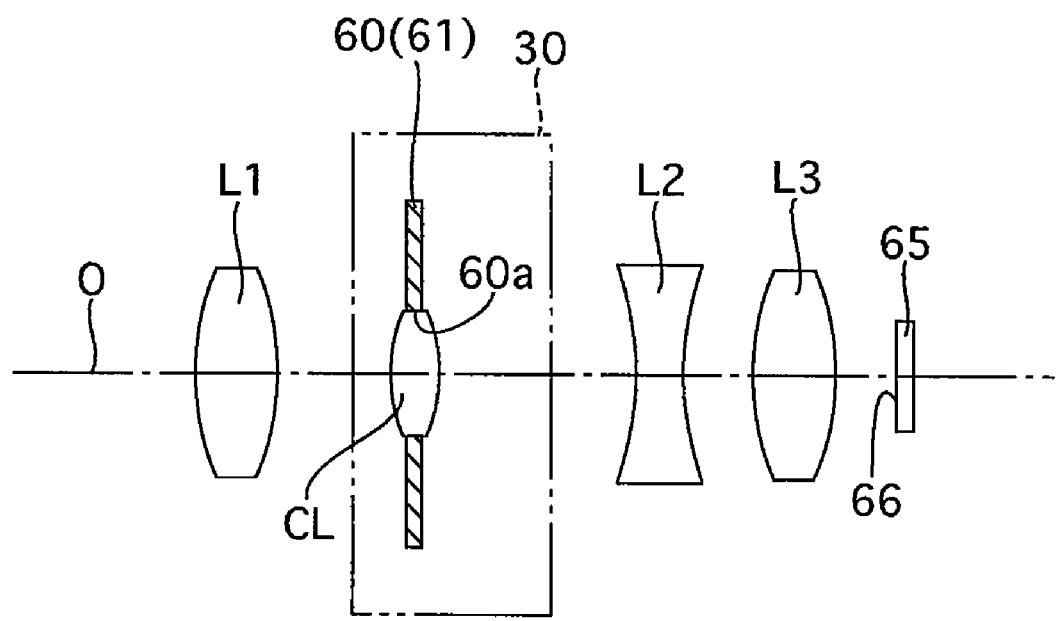
FIG. 15 is an axial cross sectional view of a portion of a modified embodiment of the camera shake correction apparatus according to the present invention, wherein a correction lens is provided.

Although the CCD 65 is secured to the electrical board 60 of the movable stage 62, which is moved in the X-axis direction and the Y-axis direction to counteract the effects of hand shake in each of the above illustrated embodiments of the camera shake correction apparatuses, it is possible to arrange the CCD 65, for example as shown in FIG. 15, behind the lens L3 and to form a circular mounting hole (through hole) 60a in the movable stage 62. A correction lens CL can be fitted and secured to the mounting hole 60a so that the optical axis of the correction lens CL extends in the same direction as that of the optical axis O, and can be arranged between the lenses L1 and L2 as shown in FIG. 15 (or alternatively between the lenses L2 and L3). In this alternative shown in FIG. 15, the correction lens CL is linearly moved in an X-Y axis plane that is parallel to both the X-axis direction and the Y-axis direction to compensate camera shake. Furthermore, the camera shake correction apparatus using the correction lens CL can be applied to a silver-halide film camera which does not use an image pickup device such as the CCD 65.

Although the two Y-axis-direction drive coils CYA and CYB and the two X-axis-direction drive coils CX (or CXA and CXB) are used in the above illustrated embodiments of the camera shake correction apparatuses, more than two Y-axis-direction drive coils and more than two X-axis-direction drive coils can be used.

Figure 11:
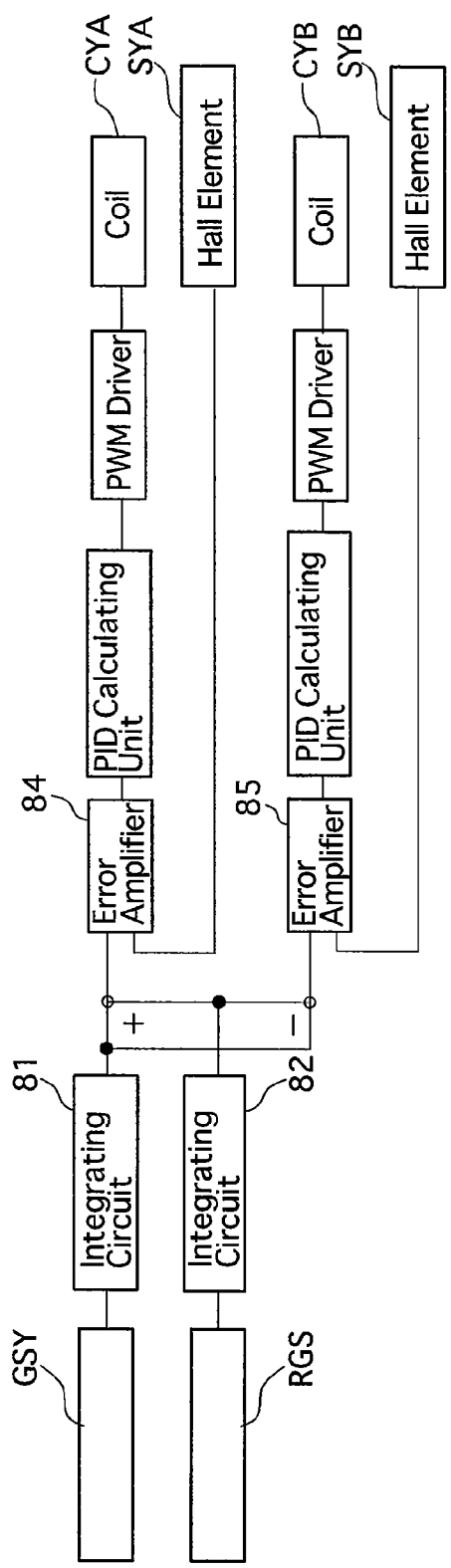
FIG. 11 is a block diagram of a control circuit for performing a Y-axis-direction camera shake correction operation and a rotation-direction camera shake correction operation.

Although a plus signal and a minus signal are sent to the error amplifiers 84 and 85, respectively, in the block diagram of the control circuit shown in FIG. 11, two signals having the same sign can be sent to the error amplifiers 84 and 85, respectively, and simultaneously the magnitude of the left driving force produced by the Y-axis-direction drive coil CYA and the magnitude of the driving force produced by the right Y-axis-direction drive coils CYB can be made different from each other. It is also possible to compensate camera shake if this kind of modification is applied since the movable stage 62 can rotate in an X-Y axis plane.

Although Hall elements are used as X-axis direction positional variation detecting sensors or Y-axis-direction positional variation detecting sensors in each of the above described embodiments, alternative sensors can also be used.

Obvious changes may be made in the specific embodiments of the present invention described herein, such modifications being within the spirit and scope of the invention claimed. It is indicated that all matter contained herein is illustrative and does not limit the scope of the present invention.

What is claimed is:
1. A stage apparatus comprising:
a stationary support board;
a movable stage positioned to face said stationary support board to be movable relative to said stationary support board;
at least three support members which are in contact with one surface of said movable stage which faces said stationary support board to be slidable thereon;
at least three position adjusting devices provided on said stationary support board and each configured to adjust a position of one of said three support members, respectively, in a direction towards and away from said movable stage; and
a biasing device which biases said movable stage in a direction to bring said three support members into contact with said movable stage.
2. The stage apparatus according to claim 1, wherein each of said three support members comprises a ball.
3. The stage apparatus according to claim 1, wherein each of said position adjusting devices comprises:
a female screw hole formed in one of said stationary support board and said movable stage; and a male screw member which is screwed into said female screw hole and supports said support member.

4. The stage apparatus according to claim 1, further comprising:
an X-axis-direction driver which drives said movable stage relative to said stationary support board in a specific X-axis direction parallel to said stationary support board; and
a Y-axis-direction driver which drives said movable stage relative to said stationary support board in a Y-axis direction parallel to said stationary support board and orthogonal to said specific X-axis direction.

5. The stage apparatus according to claim 4, wherein said X-axis-direction driver comprises:
at least one X-axis-direction magnetic force generator fixed to one of said stationary support board and a second stationary support board which is provided parallel to said stationary support board and faces the other surface of said movable stage; and
at least one X-axis-direction drive coil which is fixed to said movable stage and produces a driving force for driving said movable stage in said X-axis direction upon being supplied with an electric current in a state where said X-axis-direction drive coil receives a magnetic force generated by said X-axis-direction magnetic force generator.

6. The stage apparatus according to claim 4, wherein said X-axis-direction driver comprises:
at least one X-axis-direction magnetic force generator fixed to said movable stage; and
at least one X-axis-direction drive coil which is fixed to one of said stationary support board and a second stationary support board which is provided parallel to said stationary support board and faces the other surface of said movable stage, wherein said X-axis-direction drive coil produces a driving force for driving said movable stage in said X-axis direction upon being supplied with an electric current in a state where said X-axis-direction drive coil receives a magnetic force generated by said X-axis-direction magnetic force generator.

7. The stage apparatus according to claim 5, wherein said X-axis-direction magnetic force generator comprises at least one magnet and at least one yoke, a magnetic circuit being formed between said magnet and said yoke.

8. The stage apparatus according to claim 4, wherein said Y-axis-direction driver comprises:
at least one Y-axis-direction magnetic force generator fixed to one of said stationary support board and a second stationary support board which is provided parallel to said stationary support board and faces the other surface of said movable stage; and
at least one Y-axis-direction drive coil which is fixed to said movable stage and produces a driving force for driving said movable stage in said Y-axis direction upon being supplied with an electric current in a state where said Y-axis-direction drive coil receives a magnetic force generated by said Y-axis-direction magnetic force generator.

9. The stage apparatus according to claim 4, wherein said Y-axis-direction driver comprises:
at least one Y-axis-direction magnetic force generator fixed to said movable stage; and
at least one Y-axis-direction drive coil which is fixed to one of said stationary support board, and a second stationary support board which is provided parallel to said stationary support board and faces the other surface of said movable stage,
wherein said Y-axis-direction drive coil produces a driving force for driving said movable stage in said Y-axis direction upon being supplied with an electric current in a state where said Y-axis-direction drive coil receives a magnetic force generated by said Y-axis-direction magnetic force generator.

10. The stage apparatus according to claim 8, wherein said Y-axis-direction magnetic force generator comprises at least one magnet and at least one yoke, a magnetic circuit being formed between said magnet and said yoke.

11. The stage apparatus according to claim 3, wherein a recess in which said ball is partly accommodated is formed in said male screw member.

12. A stage apparatus comprising:
a first stationary support board;
a second stationary support board;
a movable stage positioned between said first stationary support board and said second stationary support board;
at least three first support members which are in contact with one of first facing surfaces of said first stationary support board and said movable stage which face each other to be slidable on said one first facing surface;
at least three second support members which are in contact with one of second facing surfaces of said second stationary support board and said movable stage which face each other to be slidable on said one second facing surface;
a position adjusting device provided on one of said first stationary support board and said movable stage which includes the other of said first facing surfaces, wherein said position adjusting device is operated to move said three first support members toward one of said first stationary support board and said movable stage, and holds said three first support members at desired position, respectively; and
a biasing force adjusting device, provided on one of said second stationary support board and said movable stage which includes the other of said second facing surfaces, for biasing said second support members against said one second facing surface.

13. The stage apparatus according to claim 12, wherein each of said three first support members comprises a ball.

14. The stage apparatus according to claim 12, wherein said position adjusting device comprises:
at least three first female screw holes formed in one of said first stationary support board and said movable stage; and
at least three first male screw members which are screwed into said three first female screw holes and support said three first support members, respectively.

15. The stage apparatus according to claim 12, wherein each of said three second support members comprises a ball.

16. The stage apparatus according to claim 12, wherein said biasing force adjusting device comprises:
at least three second female screw holes formed in one of said second stationary support board and said movable stage;
at least three second male screw members which are screwed into said second female screw holes, respectively; and
a biasing device, supported by said second male screw members, for biasing said second male screw members in a direction toward the other of said second stationary support board and said movable stage.

17. The stage apparatus according to claim 12, wherein said biasing force adjusting device comprises:

at least three second female screw holes formed in one of said second stationary support board and said movable stage;

at least three second male screw members which are screwed into said second female screw holes, respectively; and a biasing device, supported by the other of said second stationary support board and said movable stage, for biasing said second support members so as contact said second male screw members, respectively.

18. The stage apparatus according to claim 12, further comprising:

an X-axis-direction driver which drives said movable stage relative to said first stationary support board in a specific X-axis direction parallel to said first stationary support board; and a Y-axis-direction driver which drives said movable stage relative to said first stationary support board in a Y-axis direction parallel to said first stationary support board and orthogonal to said specific X-axis direction.

19. The stage apparatus according to claim 18, wherein said X-axis-direction driver comprises:

at least one X-axis-direction magnetic force generator fixed to one of said first stationary support board and said second stationary support board; and at least one X-axis-direction drive coil which is fixed to said movable stage and produces a driving force for driving said movable stage in said X-axis direction upon being supplied with an electric current in a state where said X-axis-direction drive coil receives a magnetic force generated by said X-axis-direction magnetic force generator.

20. The stage apparatus according to claim 18, wherein said X-axis-direction driver comprises:

at least one X-axis-direction magnetic force generator fixed to said movable stage; and at least one X-axis-direction drive coil which is fixed to one of said first stationary support board and said second stationary support board and produces a driving force for driving said movable stage in said X-axis direction upon being supplied with an electric current in a state where said X-axis-direction drive coil receives a magnetic force generated by said X-axis-direction magnetic force generator.

21. The stage apparatus according to claim 19, wherein said X-axis-direction magnetic force generator comprises at least one magnet and at least one yoke, a magnetic circuit being formed between said magnet and said yoke.

22. The stage apparatus according to claim 18, wherein said Y-axis-direction driver comprises:

at least one Y-axis-direction magnetic force generator fixed to one of said first stationary support board and said second stationary support board; and at least one Y-axis-direction drive coil which is fixed to said movable stage and produces a driving force for driving said movable stage in said Y-axis direction upon being supplied with an electric current in a state where said Y-axis-direction drive coil receives a magnetic force generated by said Y-axis-direction magnetic force generator.

23. The stage apparatus according to claim 18, wherein said Y-axis-direction driver comprises:

at least one Y-axis-direction magnetic force generator fixed to said movable stage; and at least one Y-axis-direction drive coil which is fixed to one of said first stationary support board and said second stationary support board, wherein said Y-axis-direction drive coil produces a driving force for driving said movable stage in said Y-axis direction upon being supplied with an electric current in a state where said Y-axis-direction drive coil receives a magnetic force generated by said Y-axis-direction magnetic force generator.

24. The stage apparatus according to claim 21, wherein said X-axis-direction magnetic force generator comprises at least one magnet and at least one yoke, a magnetic circuit being formed between said magnet and said yoke.

25. A camera shake correction apparatus provided in a camera, said camera shake correction apparatus using said stage apparatus according to claim 18, and further comprising:

a correcting optical element fixed to said movable stage;

an X-axis-direction deflection sensor for detecting deflections of said camera in said X-axis direction;

a Y-axis-direction deflection sensor for detecting deflections of said camera in said Y-axis direction; and a controller which controls operations of said X-axis-direction driver and said Y-axis-direction driver to drive said movable stage, to which said correcting optical element is fixed, in a manner to compensate camera shake in accordance with information on said deflections detected by said X-axis-direction deflection sensor and said Y-axis-direction deflection sensor.

26. The camera shake correction apparatus according to claim 25, wherein said correcting optical element comprises an image pickup device fixed to a front surface of said movable stage.

27. The camera shake correction apparatus according to claim 25, wherein said correcting optical element comprises a correction lens positioned in a through hole formed in said movable stage.

28. The camera shake correction apparatus according to claim 25, further comprising:

a rotation-direction deflection sensor for detecting deflections of said movable stage about said optical axis in a plane parallel to said movable stage, wherein said controller controls operations of said X-axis-direction driver and said Y-axis-direction driver to drive said movable stage in a manner to compensate camera shake in accordance with information on said deflections detected by said rotation-direction deflection sensor.

* * * * *